(12) United States Patent
Miyajima et al.

(10) Patent No.: US 7,155,081 B2
(45) Date of Patent: Dec. 26, 2006

(54) TWO-DIMENSIONAL OPTICAL DEFLECTOR

(75) Inventors: Hiroshi Miyajima, Hachioji (JP);
Masanori Ogata, Matsumoto (JP);
Akihiro Kitahara, Hachioji (JP);
Yoshitaka Kamiya, Hachioji (JP)

(73) Assignee: Olympus Corporation, Tokyo (JP)

( * ) Notice: Subject to any disclaimer, the term of this patent is extended or adjusted under 35 U.S.C. 154(b) by 195 days.

(21) Appl. No.: 10/995,399

(22) Filed: Nov. 23, 2004

(65) Prior Publication Data

US 2005/0111787 A1     May 26, 2005

(30) Foreign Application Priority Data

Nov. 26, 2003   (JP)  .............................. 2003-395844

(51) Int. Cl.
*G02B 6/26*     (2006.01)
*G02B 6/42*     (2006.01)

(52) U.S. Cl. ............................. 385/15; 385/16; 385/17; 385/18; 385/25

(58) Field of Classification Search .................. 385/15
See application file for complete search history.

(56) References Cited

U.S. PATENT DOCUMENTS

| 4,838,632 | A |   | 6/1989 | Manian |
| 5,600,120 | A |   | 2/1997 | Peng |
| 5,870,219 | A |   | 2/1999 | Plesko |
| 6,108,118 | A | * | 8/2000 | Minamoto ................... 359/224 |
| 2002/0060830 | A1 |   | 5/2002 | Miyajima et al. |
| 2002/0163702 | A1 |   | 11/2002 | Hori et al. |
| 2003/0038693 | A1 |   | 2/2003 | Tokuda |

FOREIGN PATENT DOCUMENTS

JP          2003-344797         12/2003

* cited by examiner

*Primary Examiner*—Frank G. Font
*Assistant Examiner*—Mary El-Shammaa
(74) *Attorney, Agent, or Firm*—Scully, Scott, Murphy & Presser, P.C.

(57) ABSTRACT

A two-dimensional optical deflector includes a first deflector, which deflects a light beam about a first axis at a high speed, a second deflector, which deflects a light beam about a second axis perpendicular to the first axis at a low speed, and a fixing mechanism, which fixes the first deflector to the second deflector. The second deflector includes a rotation shaft capable of rocking about the second axis. The fixing mechanism includes a fixing member having a rotation shaft fixing hole, which engages with the rotation shaft with almost no space, and a fastener, which decreases the diameter of the rotation shaft fixing hole of the fixing member. The fixing member includes a first deflector mount surface. The first deflector is fixed to the fixing member so that a reflecting surface of the first deflector in a non-actuation state is almost parallel to the first deflector mount surface.

38 Claims, 13 Drawing Sheets

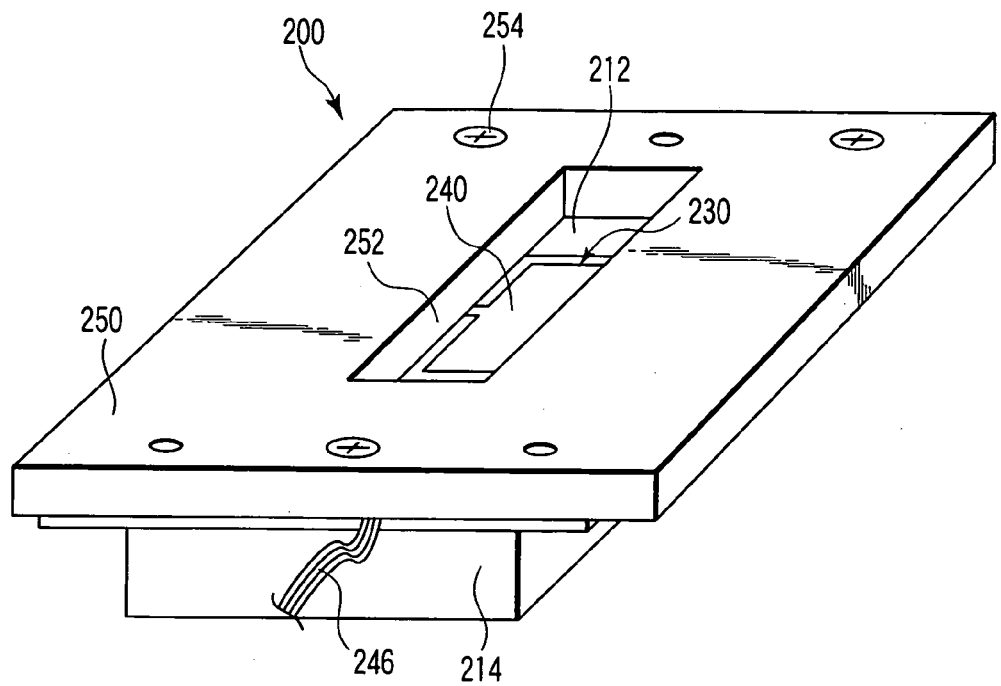
F I G. 4
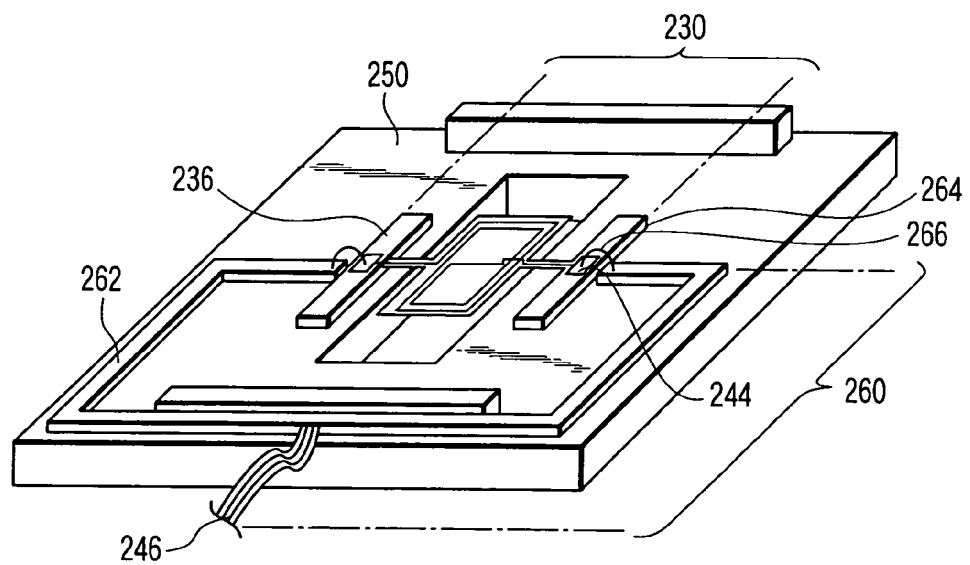
F I G. 5

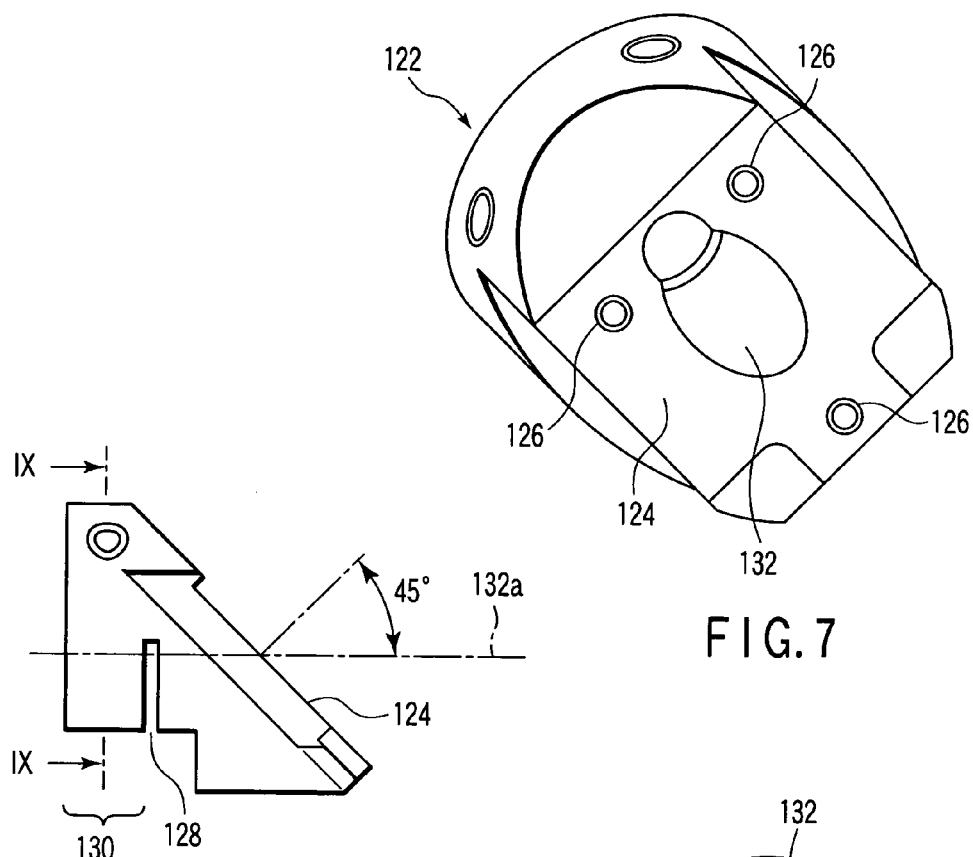
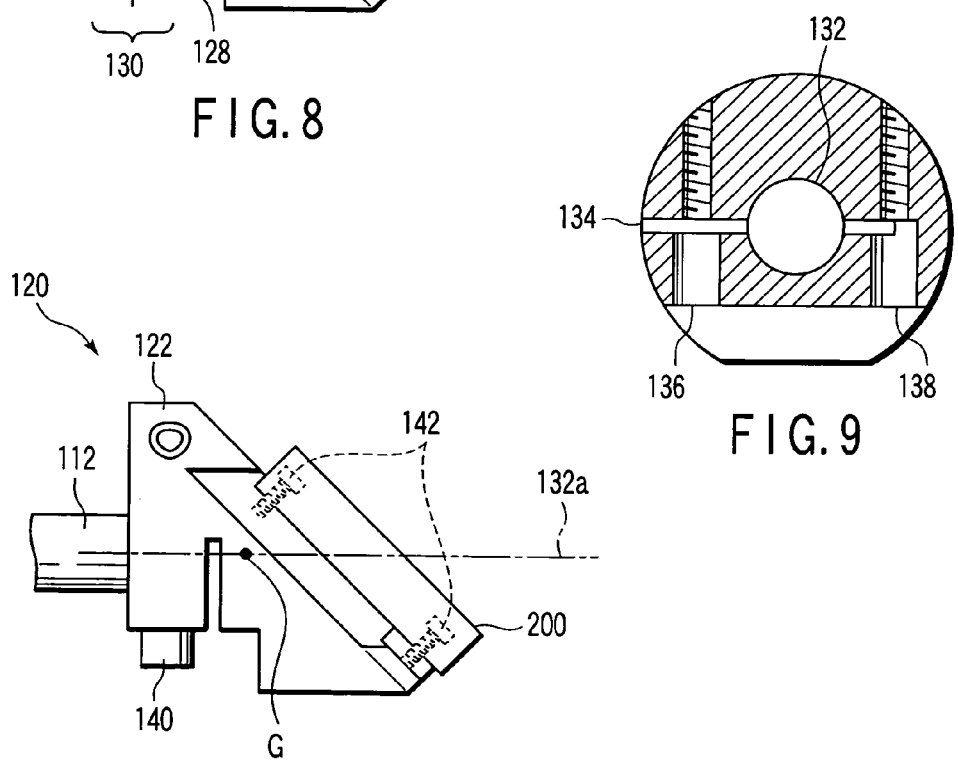

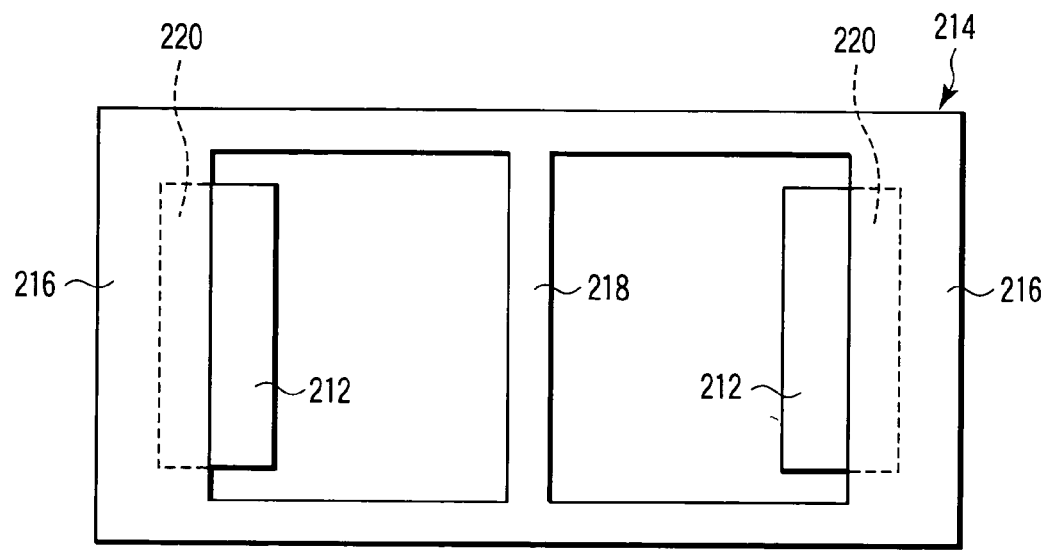
F I G. 25
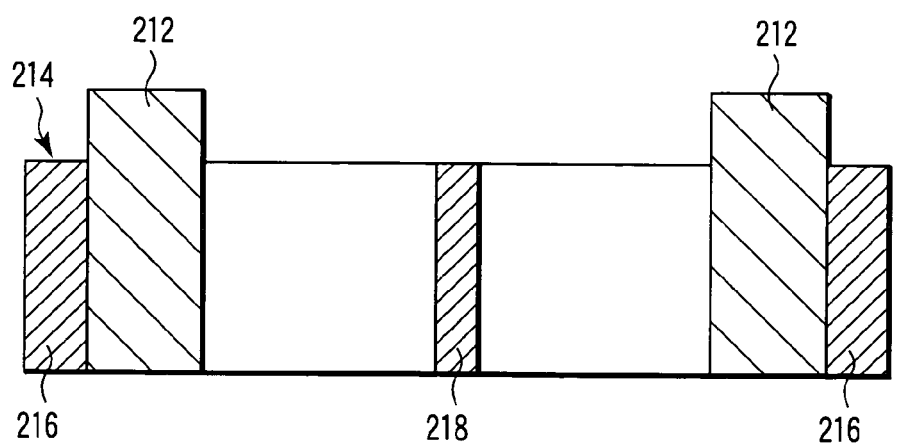
F I G. 26

TWO-DIMENSIONAL OPTICAL DEFLECTOR

CROSS-REFERENCE TO RELATED APPLICATIONS

This application is based upon and claims the benefit of priority from prior Japanese Patent Application No. 2003-395844, filed Nov. 26, 2003, the entire contents of which are incorporated herein by reference.

BACKGROUND OF THE INVENTION

1. Field of the Invention

The present invention relates to an optical deflector.

2. Description of the Related Art

A two-dimensional optical deflector, which two-dimensionally deflects light beams, includes two galvano deflectors, which are orthogonally arranged and each of which respectively have a mirror. When such a two-dimensional optical deflector actually deflects a light beam, the locus of the light beam distorts on an image plane.

U.S. Pat. No. 4,838,632 discloses a two-dimensional optical deflector that reduces such distortion. FIGS. 29 and 30 show the two-dimensional optical deflector disclosed in U.S. Pat. No. 4,838,632. FIG. 29 is a view of the two-dimensional optical deflector viewed along a line XXIX—XXIX in FIG. 30. FIG. 30 is a view of the two-dimensional optical deflector viewed along a line XXX—XXX in FIG. 29.

As shown in FIGS. 29 and 30, a two-dimensional optical deflector 500 includes a first deflector 510 and second deflector 520. The first deflector 510 includes a movable portion 512 having a reflecting surface and a bracket 514 supporting the movable portion 512 to allow it to rock about a first axis A1. The second deflector 520 causes the first deflector 510 to rock about a second axis A2 perpendicular to the first axis A1. The first deflector 510 is fixed to the second deflector 520 so that the reflecting surface of the movable portion 512 forms an angle of 45° with respect to the second axis A2 in the non-deflection mode.

An incident light beam LB1 to be deflected falls on the first deflector 510 so as to be parallel to the second axis A2. A light beam LB2 reflected by the reflecting surface of the movable portion 512 falls on an image plane 534 through a lens 532.

The two-dimensional optical deflector 500 realizes a reduction in the distortion of the locus of a light beam on an image plane in spite of the fact that the deflector has a simple arrangement and is very compact.

In the two-dimensional optical deflector 500, the second deflector 520 causes the first deflector 510 integrally to rock about a rocking axis parallel to the incident light beam. For this reason, the size, mass, and moment of inertia of the first deflector 510 are important factors in realizing a compact two-dimensional optical deflector with a simple arrangement.

The specification of U.S. Pat. No. 4,838,632, however, provides no teaching or suggestion about the specific arrangement of the first deflector. In addition, the specification also provides no teaching or suggestion about a method of fixing the first deflector 510 to the second deflector 520 so that the reflecting surface of the movable portion 512 in the non-deflection state forms an angle of 45° with respect to the second axis A2.

BRIEF SUMMARY OF THE INVENTION

A two-dimensional optical deflector according to the present invention includes a first deflector for deflecting a light beam about a first axis at a high speed, a second deflector for deflecting a light beam about a second axis perpendicular to the first axis at a low speed, and a fixing mechanism for fixing the first deflector to the second deflector. The first deflector includes a deflector chip and actuating means for actuating the deflector chip. The deflector chip includes a movable portion including a reflecting surface, a support located outside the movable portion, and a connecting portion connecting the movable portion and the support. The connecting portion extends along the first axis, and is capable of twisting about the first axis, so as to allow the movable portion to rock about the first axis with respect to the support. The second deflector includes a rotation shaft capable of rocking about the second axis. The fixing mechanism includes a fixing member having a rotation shaft fixing hole, which engages with the rotation shaft of the second deflector with substantially no space between them, and fastening means for decreasing a diameter of the rotation shaft fixing hole of the fixing member. The diameter of the rotation shaft fixing hole of the fixing member is decreased by the fastening means, so that the fixing member is fixed to the rotation shaft of the second deflector. The fixing member further includes a first deflector mount surface, on which the first deflector is mounted. The first deflector mount surface forms an angle of substantially 45° with respect to the second axis while the fixing member is fixed to the rotation shaft of the second deflector. The fixing mechanism further includes fixing means for fixing the first deflector to the fixing member so that the reflecting surface of the movable portion in a non-actuation state is substantially parallel to the first deflector mount surface of the fixing member.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the present invention.

FIG. 4 is a perspective view showing another example of the resonant MEMS deflector shown in FIGS. 1 and 2;

FIG. 5 is a perspective view of a metal base and deflector chip shown in FIG. 4, which is upside down with respect to FIG. 4;

FIG. 7 is a perspective view showing the adapter shown in FIGS. 1 and 2;

FIG. 8 is a side view of the adapter shown in FIG. 7;

FIG. 9 is a sectional view taken along a line IX—IX of the adapter in FIG. 8;

FIG. 10 is a side view of the adapter like FIG. 8, showing a state wherein the adapter is fixed to a galvano deflector, and an MEMS deflector is mounted on the adapter;

FIG. 25 is a bottom view of the magnetic circuit shown in FIG. 23;

FIG. 26, which is a sectional view similar to FIG. 24, shows the magnetic circuit in the MEMS deflector according to the first embodiment;

DETAILED DESCRIPTION OF THE INVENTION

The embodiments of the present invention will be described below with reference to the views of the accompanying drawing. In this specification, the term "deflector" includes a scanner and switch.

First Embodiment

Figure 1:
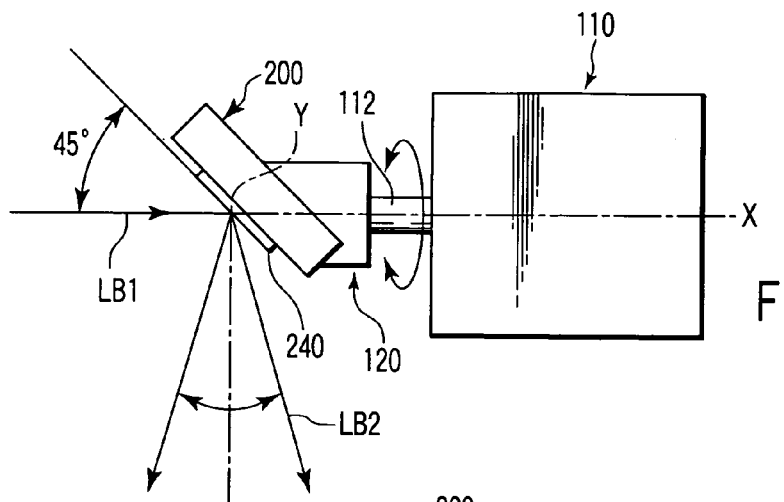
FIG. 1 is a side view of a two-dimensional optical deflector according to the first embodiment of the present invention.
Figure 2:
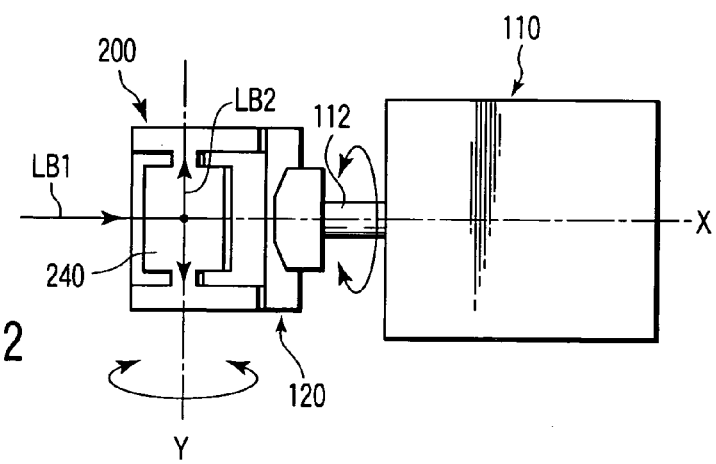
FIG. 2 is a front view of the two-dimensional optical deflector shown in FIG. 1.

FIG. 1 is a side view of a two-dimensional optical deflector according to the first embodiment of the present invention. FIG. 2 is a front view of the two-dimensional optical deflector shown in FIG. 1.

As shown in FIGS. 1 and 2, the two-dimensional optical deflector according to this embodiment includes a galvano deflector 110, a resonant MEMS deflector 200, and an adapter 120 for fixing the resonant MEMS deflector 200 to the galvano deflector 110.

The galvano deflector 110 serves to deflect an incident light beam LB1 about the X-axis at a relatively low speed. The resonant MEMS deflector 200 serves to deflect the incident light beam LB1 about the Y-axis perpendicular to the X-axis at a relatively high speed.

The galvano deflector 110 includes a rotation shaft 112, which can rock about the X-axis. The resonant MEMS deflector 200 is fixed to the rotation shaft 112 of the galvano deflector 110 through the adapter 120.

Although described in detail later, the resonant MEMS deflector 200 has a reflecting surface 240 for reflecting the incident light beam LB1. The reflecting surface 240 can rock about the Y-axis. The adapter 120 fixes the resonant MEMS deflector 200 to the rotation shaft 112 of the galvano deflector 110 so that the reflecting surface of the resonant MEMS deflector 200 forms an angle of almost 45° with respect to the X-axis in a non-actuation state (neutral state).

In this two-dimensional optical deflector, the incident light beam LB1 travels on an extension of the central axis of the rotation shaft 112 of the galvano deflector 110, i.e., the X-axis, and is reflected by the reflecting surface 240 of the resonant MEMS deflector 200.

A reflected light beam LB2 is deflected about the Y-axis in correspondence with the rocking of the reflecting surface 240 of the resonant MEMS deflector 200 about the Y-axis, as shown in FIG. 1. The reflected light beam LB2 is also deflected about the X-axis in correspondence with the rocking of the reflecting surface 240 of the resonant MEMS deflector 200 about the X-axis, with the rocking of the reflecting surface 240 being caused by the rocking of the rotation shaft 112 of the galvano deflector 110 about the X-axis, as shown in FIG. 2.

Figure 3:
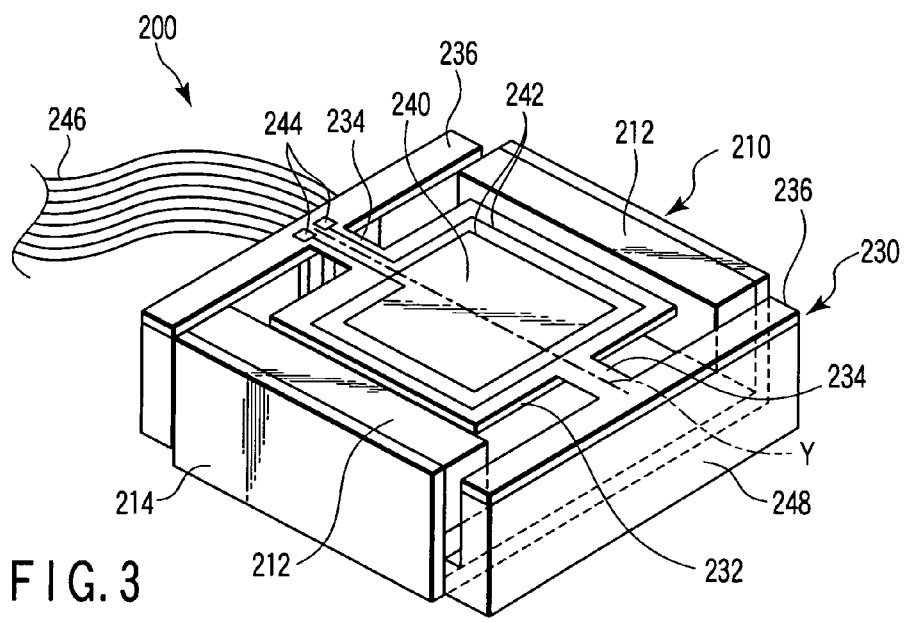
FIG. 3 is a perspective view showing an example of the resonant MEMS deflector shown in FIGS. 1 and 2.

FIG. 3 is a perspective view of an example of the resonant MEMS deflector shown in FIGS. 1 and 2.

As shown in FIG. 3, the resonant MEMS deflector 200 includes a magnetic circuit 210, which generates a magnetic field, a deflector chip 230, and a metal base 248, which holds the deflector chip 230. The resonant MEMS deflector 200 also includes a flexible wiring board 246 for inputting/outputting electrical signals from/to an external unit.

The deflector chip 230 includes a movable plate 232, two supports 236 located outside the movable plate 232, and two torsion bars 234 connecting the movable plate 232 to the supports 236. The two torsion bars 234 both extend on an almost straight line along the Y-axis. The torsion bars 234 are capable of twisting about the Y-axis and allow the movable plate 232 to rock about the Y-axis with respect to the supports 236. The supports 236 are fixed to the metal base 248 with an adhesive.

The reflecting surface 240 is formed on the upper surface of the movable plate 232. The movable plate 232 has on the lower surface a driving coil 242, which runs round near the edge of the movable plate 232. FIG. 3 shows the driving coil 242 for purposes of illustration, although the coil is not actually seen because it is provided on the lower surface of the movable plate 232. The two end portions of the driving coil 242 pass through one torsion bar 234 and are electrically connected to two electrode pads 244, respectively, which are provided on the support 236. FIG. 3 also shows the electrode pads 244 for purposes of illustration, although the electrode pads are not actually seen because they are provided on the lower surface of the movable plate 232.

The deflector chip 230 is integrally formed from a single-crystal silicon substrate by etching using the MEMS technique established by applying a semiconductor manufacturing process.

The magnetic circuit 210 includes two permanent magnets 212 and a magnetic yoke 214, to which the permanent magnets 212 are fixed. The two permanent magnets 212 are arranged on the two sides of the movable plate 232. In this case, the two permanent magnets 212 are arranged so that their magnetization directions are almost perpendicular to the direction in which the torsion bars 234 extend, and almost parallel to the reflecting surface of the movable portion in a non-actuation state. That is, the magnetic circuit 210 generates a magnetic field that is almost parallel to the reflecting surface 240 of the movable plate 232 in a non-actuation state and almost perpendicular to the longitudinal direction (extension direction) of the torsion bars 234.

When a current flows in the driving coil 242, opposing forces act on the two portions of the driving coil 242 that are parallel to the torsion bars 234 in a direction perpendicular to the reflecting surface 240 of the movable plate 232 in a non-actuation state by Fleming's left-hand rule. That is, a couple of forces are generated about the Y-axis. The couple of forces give torque to the movable plate 232. The movable plate 232 tilts about the Y-axis in accordance with the relationship between the torque and the reaction force of the torsion bars 234.

The magnitude of the force acting on the driving coil 242 depends on the magnitude of the current flowing in the driving coil 242. In addition, the direction of the force acting on the driving coil 242 depends on the direction of the current flowing in the driving coil 242. If, therefore, the current flowing in the driving coil 242 is an AC current, the movable plate 232 repeatedly tilts clockwise and counterclockwise within a predetermined angular range. That is, the movable plate 232 rocks about the Y-axis.

As described above, the magnetic circuit 210 and driving coil 242 constitute an actuating means or actuator that causes the movable plate 232 to rock.

The resonant frequency of the deflector chip 230 depends on the moment of inertia of the movable plate 232 and the torsional rigidity of the torsion bars 234. Supplying an AC current with a frequency equal to this resonant frequency to the driving coil 242 makes it possible to obtain a large deflection angle with a small actuating current.

Figure 6:
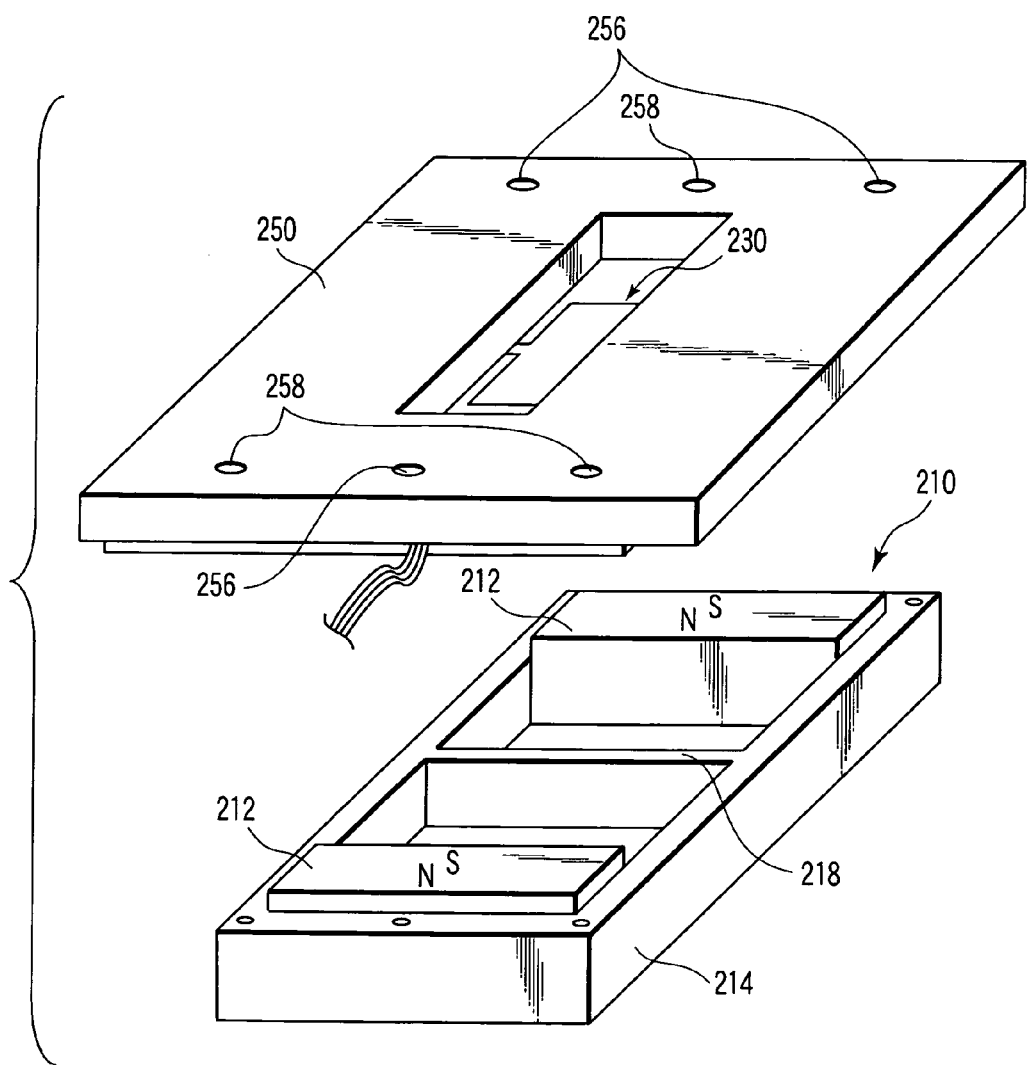
FIG. 6 is an exploded perspective view of the resonant MEMS deflector shown in FIG. 4.

FIG. 4 is a perspective view showing another example of the resonant MEMS deflector shown in FIGS. 1 and 2. FIG. 5 is a perspective view of the metal base and deflector chip shown in FIG. 4. This view is upside down with respect to FIG. 4. FIG. 6 is an exploded perspective view of the resonant MEMS deflector shown in FIG. 4. In FIGS. 4 to 6, members denoted by the same reference numerals as in FIG. 3 represent the same members as in FIG. 3, and a detailed description thereof will be omitted.

Since the details of the resonant MEMS deflector shown in FIGS. 4 to 6 are disclosed in Patent Application Publication No. US 2002/0060830 A1, only its outline will be given here. The arrangement and operation of the resonant MEMS deflector shown in FIGS. 4 to 6 are basically the same as those of the resonant MEMS deflector shown in FIG. 3. In the following description, emphasis is placed on the differences between these deflectors.

As shown in FIGS. 4 to 6, in the resonant MEMS deflector 200, the deflector chip 230 is fixed to a metal base 250 so that the reflecting surface 240 faces the metal base 250. The metal base 250 has an opening 252. As shown in, for example, FIG. 4, the reflecting surface 240 is exposed through the opening 252 of the metal base 250.

More specifically, as shown in FIG. 5, the metal base 250 has protrusions 264, to which the supports 236 of the deflector chip 230 are fixed. The supports 236 are fixed to the protrusions with an adhesive so that the opposite surfaces of the supports 236 to the surfaces on which the electrode pads 244 are formed, i.e., the same surface of the movable plate 232 as that on which the reflecting surface 240 is formed, are in contact with the upper surfaces of the protrusions.

In the deflector chip 230 of the resonant MEMS deflector 200, the two electrode pads 244 are provided on the two supports 236, respectively. A wiring member 260 including a rigid board 262 and the flexible wiring board 246 is mounted on the metal base 250. The two end portions of the rigid board 262 are respectively located near the two supports 236, and electrically connected to the electrode pads 244 on the supports 236 through wire bondings 266. The flexible wiring board 246 is electrically connected to a middle portion of the rigid board 262.

The procedure of mounting the deflector chip 230 on the metal base 250 is disclosed in, for example, Patent Application Publication No. US 2002/0060830 A1. According to the mounting procedure disclosed in this reference, first of all, the wiring member 260 is bonded to the metal base 250. The deflector chip 230 is then bonded to the metal base 250. At this point of time, the deflector chip 230 has a support frame surrounding the movable plate 232, although not shown in FIG. 5. Those portions of the support frame that are not in contact with the protrusions 264 are removed by cutting, and the remaining portions become the supports 236 shown in FIG. 5.

The mounting procedure is not, however, limited to this. For example, after the deflector chip 230 is bonded to the metal base 250 and the support frame is partly removed, the wiring member 260 may be bonded to the metal base 250.

The wiring member 260 is preferably a member obtained by integrally forming the rigid board 262 and flexible wiring board 246. However, the present invention is not limited to this. For example, the wiring member 260 may have an arrangement in which a flexible lead wires are soldered to the rigid board 262. For soldering, it is necessary to ensure a certain area on the rigid board 262. In contrast to this, using the wiring member 260 obtained by integrally forming the rigid board 262 and flexible wiring board 246 makes it unnecessary to ensure any special region for the attaching portion between the rigid board 262 and the flexible wiring board 246, and hence is suitable for reducing the overall area of the flexible wiring board 246. This will contribute to reducing the area of the metal base 250 in FIG. 5, i.e., the overall size and weight of the resonant MEMS deflector 200.

The resonant MEMS deflector 200 is completed when the metal base 250, on which the deflector chip 230 and wiring member 260 are mounted, is attached to the magnetic circuit 210, as shown in FIG. 6. In the resonant MEMS deflector 200, the magnetic circuit 210 includes a middle yoke 218 in addition to the magnetic yoke 214, to which the permanent magnets 212 is fixed.

For example, the metal base 250 and magnetic circuit 210 are fixed to each other with three nonmagnetic or weak magnetic screws 254 (see FIG. 4) through three magnetic circuit fixing holes 256 formed in the metal base 250. The metal base 250 has, for example, three external fixing holes 258 in addition to the magnetic circuit fixing holes 256. The external fixing holes 258 are used to fix the resonant MEMS deflector 200 to the adapter 120.

As described above, using the resonant MEMS deflector 200 as a high-speed deflector makes it possible to achieve a great reduction in size as compared with the prior art.

FIG. 7 is a perspective view of the adapter shown in FIGS. 1 and 2. FIG. 8 is a side view of the adapter shown in FIG. 7. FIG. 9 is a sectional view taken along a line IX—IX of the adapter in FIG. 8. FIG. 10 is a side view of the adapter like FIG. 8, and shows a state wherein the adapter is fixed to the rotation shaft of the galvano deflector, and the resonant MEMS deflector is mounted on the adapter.

As shown in FIG. 10, the adapter 120, which comprises a fixing mechanism for fixing the resonant MEMS deflector 200 to the rotation shaft 112 of the galvano deflector 110, includes an adapter body 122, screws 140 for fixing the adapter body 122 to the rotation shaft 112 of the galvano deflector 110, and screws 142 for fixing the resonant MEMS deflector 200 to the adapter body 122.

As shown in FIG. 7, the adapter body 122 includes a rotation shaft fixing hole 132, which engages with the rotation shaft 112 of the galvano deflector 110 with almost no space between them, and an MEMS deflector mount surface 124, on which the resonant MEMS deflector 200 is mounted.

As shown in FIG. 8, the adapter body 122 has a rotation shaft fastening portion 130, in which the diameter of the rotation shaft fixing hole 132 can be decreased. As shown in FIGS. 9 and 8, slits 134 and 128 are formed near the rotation shaft fastening portion 130. The slit 134 allows the diameter of the rotation shaft fixing hole 132 to decrease. The slit 128 facilitates decreasing the diameter of the rotation shaft fixing hole 132 of the rotation shaft fastening portion 130, and effectively prevents the deformation of the rotation shaft fastening portion 130 from affecting the MEMS deflector mount surface 124.

As shown in FIG. 9, the rotation shaft fastening portion 130 is provided with two screw holes 136 and 138, which are symmetrical with respect to the rotation shaft fixing hole 132. The screw hole 136 receives a screw 140 that mainly contributes to fastening the rotation shaft fastening portion 130 to the rotation shaft 112 of the galvano deflector 110. The screw hole 138 receives a screw 140 that is used for symmetrical weight distribution with respect to the rotation shaft fixing hole 132.

The adapter body 122 is fixed to the rotation shaft 112 of the galvano deflector 110 in the following manner. The screw 140 is fastened in the screw hole 136 while the rotation shaft 112 of the galvano deflector 110 is inserted in the rotation shaft fixing hole 132. With this operation, the diameter of the rotation shaft fixing hole 132 of the rotation shaft fastening portion 130 decreases, so that the space between the rotation shaft fixing hole 132 and the rotation shaft 112 of the galvano deflector 110 disappears. As a consequence, the adapter body 122 is reliably fixed to the rotation shaft 112 of the galvano deflector 110.

Another screw 140 is fastened in the screw hole 138. With this operation, even if the screws 140 are mounted in the screw holes 136 and 138 in a state wherein the resonant MEMS deflector 200 is fixed to the adapter 120 and a center of gravity G is located almost on a central axis 132a, the center of gravity G is located almost on the rotation axis. In this state, the inertial force (centrifugal force) generated upon the rocking of the galvano deflector 110 becomes almost zero, thus suppressing unnecessary resonance.

As described above, the screw 140 serves as a fastening means or fastener for decreasing the diameter of the rotation shaft fixing hole 132 of the adapter body 122. The diameter of the rotation shaft fixing hole of the fixing member is decreased by the screw 140, so that the adapter body 122 is fixed to the rotation shaft 112 of the galvano deflector 110.

As shown in FIG. 8, the MEMS deflector mount surface 124 formed on the adapter body 122 forms an angle of almost 45° with respect to the central axis 132a of the rotation shaft fixing hole 132. Therefore, in a state wherein the adapter 120 is fixed to the rotation shaft 112 of the galvano deflector 110, the MEMS deflector mount surface 124 forms an angle of almost 45° with respect to the central axis of the rotation shaft 112 of the galvano deflector 110, i.e., the X-axis.

For example, the adapter body 122 has three female screws 126 on the MEMS deflector mount surface 124. For example, the resonant MEMS deflector 200 shown in FIGS. 4 to 6 is fixed to the adapter 120 by fastening the screws 142 engaged with the female screws 126 through the external fixing holes 258 formed in the metal base 250. The screws 142 are preferably nonmagnetic or weakly magnetic. The resonant MEMS deflector 200 in FIG. 3 is fixed to the adapter 120 by using the external fixing holes (not shown) formed in the metal base 248.

More specifically, the resonant MEMS deflector 200 is fixed to the adapter body 122 so that the reflecting surface 240 of the movable plate 232 in a non-actuation state is almost parallel to the MEMS deflector mount surface 124 of the adapter body 122.

As described above, the screws 142 serve as a fixing means or fixer for fixing the resonant MEMS deflector 200 to the adapter body 122, and allow the resonant MEMS deflector 200 to be fixed to the adapter body 122 so that the reflecting surface 240 of the movable plate 232 in a non-actuation state is almost parallel to the MEMS deflector mount surface 124 of the adapter body 122.

As shown in FIG. 10, while the adapter 120 and resonant MEMS deflector 200 are fixed to each other, the overall center of gravity G of the adapter 120 and resonant MEMS deflector 200 is preferably located almost on the central axis 132a of the rotation shaft fixing hole 132 of the adapter body 122. In this case, the overall center of gravity G of the adapter 120 and resonant MEMS deflector 200 is positioned almost on the central axis of the rotation shaft 112 of the galvano deflector 110, i.e., the X-axis, while the adapter 120 is fixed to the rotation shaft 112 of the galvano deflector 110.

The adapter body 122 preferably has a cylindrical side surface. The adapter body 122 is manufactured by, for example, cutting a cylindrical member at 45° with respect to the central axis 132a. If the cylindrical member is simply cut at 45°, the center of gravity G deviates from the central axis 132a. However, by cutting the member into a shape like that shown in FIG. 10 (a so-called "D-cut shape" in FIG. 9), the position of the center of gravity G can be made to coincide with the central axis 132a.

In other words, referring to FIG. 10, the adapter body 122 has as the MEMS deflector mount surface 124 an end face that is formed so as to have an angle of 45° with respect to the central axis 132a, and the other end (on the rotation shaft 112 side of the galvano deflector 110) with a shape formed by cutting off a portion of the adapter body 122 from a side surface to the center so that the cut-off portion includes a part of the side surface of the adapter body 122 that includes the largest length along the central axis 132*a*.

For the sake of easy understanding of the shape of the adapter body, the method of manufacturing it from the cylindrical member has been exemplified. However, an adapter body may be manufactured by another method. In the above description, the terms "cut" and "remove" are used to explain the shape of the finished product in comparison with the cylindrical member before the process, and impose no limitation on the manufacturing method to be used. An adapter body may be manufactured by another manufacturing method such as injection molding as long as it has a shape similar to that described above in the end.

That is, the adapter body 122 is generally cylindrical, has as the MEMS deflector mount surface 124 an end face having an angle of 45° with respect to the central axis 132*a*, and has a cutout near the other end face opposite to the 45°-inclined end face, the cutout including a part of the side surface that has the largest length along the central axis 132*a* of the adapter body 122.

Figure 11:
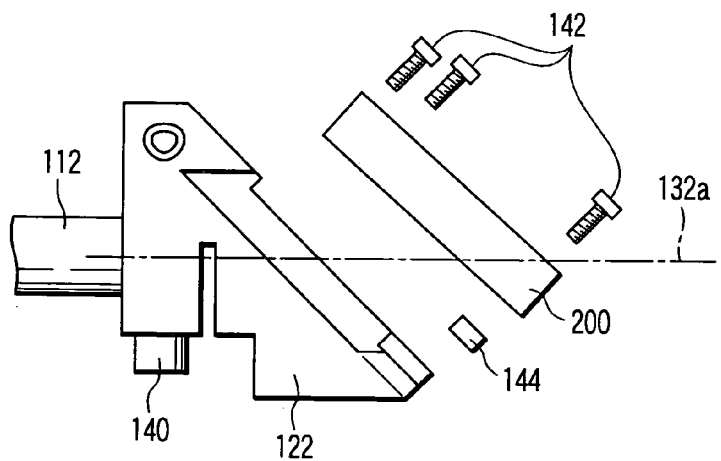
FIG. 11 is a view showing a state before the MEMS deflector is fixed to the adapter body in fixing the MEMS deflector to the adapter body by using a space adjusting member.
Figure 12:
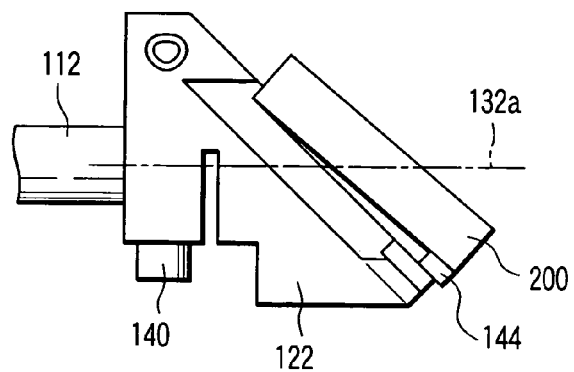
FIG. 12 is a view showing a state wherein the MEMS deflector is fixed to the adapter body in fixing the MEMS deflector to the adapter body by using the space adjusting member.

FIGS. 11 and 12 show how the resonant MEMS deflector is fixed to the adapter body by using a space adjusting member. FIG. 11 shows a state before the resonant MEMS deflector is fixed to the adapter body. FIG. 12 shows a state after the resonant MEMS deflector is fixed to the adapter body.

As shown in FIGS. 11 and 12, when the resonant MEMS deflector 200 is to be fixed to the adapter body 122, a spacer 144 may be inserted between the resonant MEMS deflector 200 and the adapter body 122 to accurately match the angle of the reflecting surface 240 provided on the movable plate 232 of the resonant MEMS deflector 200 in a non-actuation state (neutral position) with a predetermined posture (e.g., 45°) of the galvano deflector 110 with respect to the rotation shaft 112. If the spacer 144 is inserted near at least one of the three screws 142 when the resonant MEMS deflector 200 is fixed to the adapter body 122 with the three screws 142, the reflecting surface 240 of the resonant MEMS deflector 200 can be accurately positioned with respect to the rotation shaft 112 of the galvano deflector 110. Note that the placement position of the spacer 144 is not limited to the position near the screw 142.

The relative posture adjustment for the resonant MEMS deflector 200 and spacer 144 is not limited to the method using the spacer 144 in this manner. For example, an adjusting mechanism may be provided for the adapter 120 or resonant MEMS deflector 200.

Figure 13:
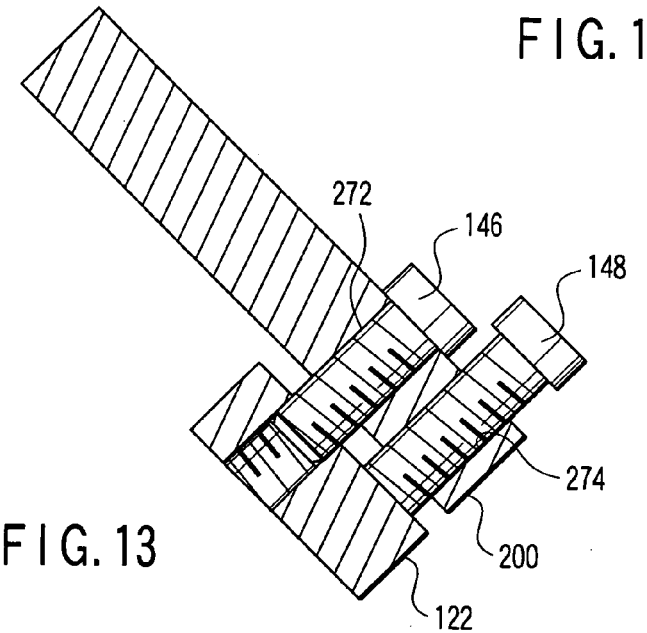
FIG. 13 is a view showing an example of an adjusting mechanism for the space between the MEMS deflector and the adapter body.

FIG. 13 shows an example of an adjusting mechanism for the space between the resonant MEMS deflector and the adapter body. As shown in FIG. 13, this adjusting mechanism adjusts the space between the resonant MEMS deflector 200 and the adapter body 122 by using a pair of screws (an MEMS fixing screw 146 and adjusting screw 148). The resonant MEMS deflector 200 has a through hole 272, through which the MEMS fixing screw 146 extends, and a female screw 274, with which the adjusting screw 148 engages. When the adjusting screw 148 is screwed into the female screw, the adjusting screw 148 protrudes from the rear side (the lower left side in FIG. 13) of the resonant MEMS deflector 200. This provides the same effect as inserting the spacer 144 between the resonant MEMS deflector 200 and the adapter body 122. By fastening the MEMS fixing screw 146 while a predetermined protrusion amount is obtained, the resonant MEMS deflector 200 and adapter body 122 are fixed to each other with a predetermined space being ensured between them. This makes it possible to maintain the relative posture in a predetermined state. Providing such an adjusting mechanism in place of at least one of the three screws 142 for fixing the MEMS deflector makes it possible to adjust the posture.

The above spacer 144 or adjusting mechanism is not limited to one in number; two or three such spacers or mechanisms may be used.

According to the adapter 120 having the above arrangement, since the adapter body 122 is formed from one component, i.e., the rotation shaft fastening portion 130 has an integral structure, it is easy to perform dimensional control on components (the diameter of the galvano deflector fixing hole, in particular) and assembly work.

Figure 14:
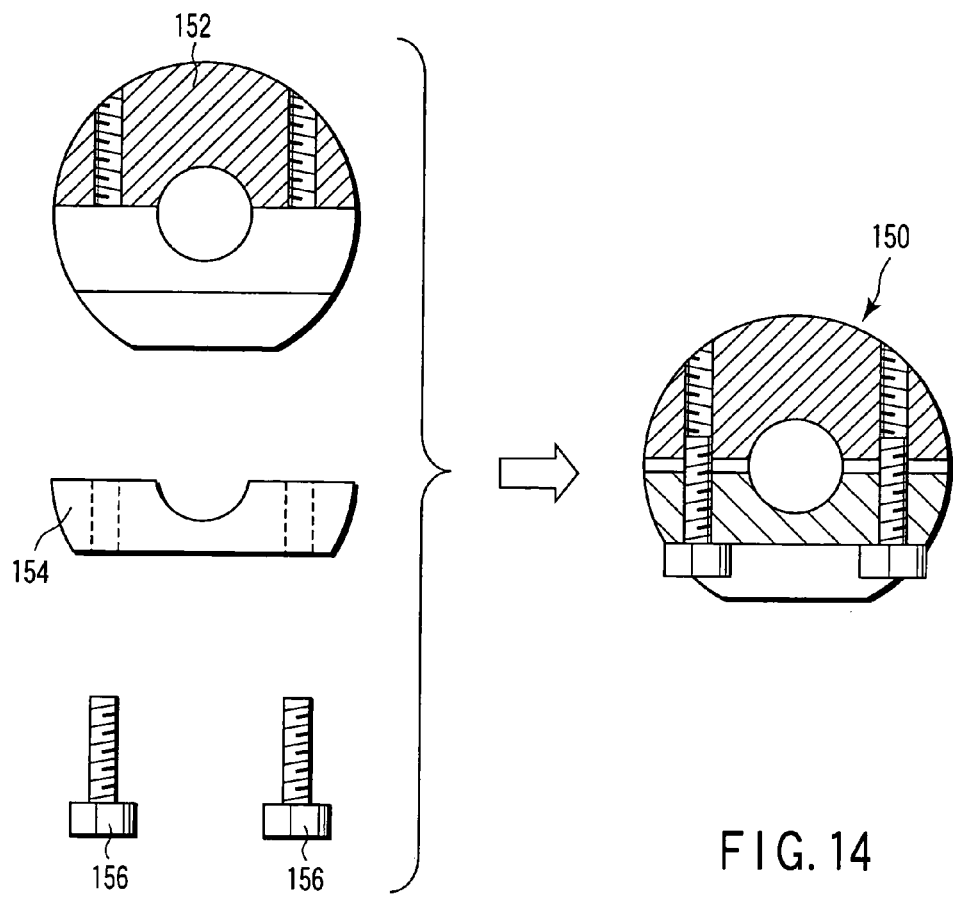
FIG. 14 is a view showing another adapter, which can be used in place of the adapter shown in FIGS. 7 to 9.

The arrangement of the adapter 120 is not limited to the above. FIG. 14 shows another adapter, which can be used in place of the adapter 120. As shown in FIG. 14, an adapter 150 comprises an adapter body 152, a discrete presser foot 154, which engages with the adapter body 152, and two screws 156, which fix the adapter body and presser foot.

Figure 15:
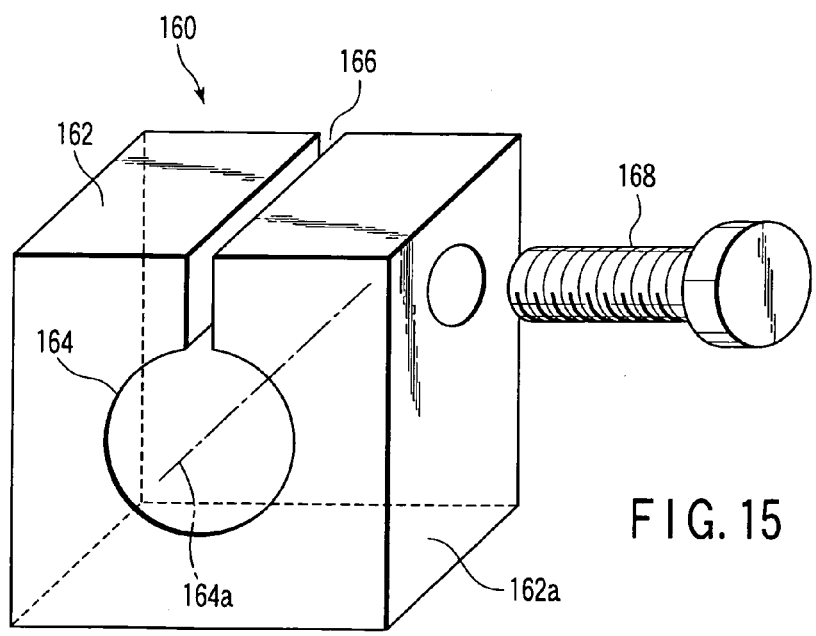
FIG. 15 is a view showing a holder for holding the galvano deflector shown in FIGS. 1 and 2.

FIG. 15 shows a holder for holding the galvano deflector shown in FIGS. 1 and 2.

In general, the outer surface portion of the galvano deflector 110 is cylindrical, and its central axis coincides with a central axis of the rotation shaft 112. As shown in FIG. 15, a holder 160 comprises a holder body 162 and screw 168. The holder body 162 has a galvano deflector mount hole 164 having a slight space with respect to the outer surface portion of the galvano deflector 110. In other words, the holder body 162 has the galvano deflector mount hole 164, with which the outer surface portion of the galvano deflector 110 engages with almost no space between them. A slit 166 is also formed in the holder body 162. The slit 166 allows the diameter of the galvano deflector mount hole 164 of the holder body 162 to decrease.

Although not specifically shown, the holder body 162 has a through hole, through which the screw 168 extends, and a female screw, with which the screw 168 extending through the through hole engages. The screw 168 extends through the through hole in the holder body 162, crosses the slit 166, and engages with the female screw of the holder body 162. The screw 168 is fastened to the holder body 162 to narrow the galvano deflector mount hole 164 of the holder body 162.

The holder body 162 has, for example, a rectangular parallelepiped shape in appearance. A mount surface 162*a* to be mounted on an external unit is almost parallel to a central axis 164*a* of the galvano deflector mount hole 164. By setting the mount surface 162*a* as a reference surface, the posture of the two-dimensional deflector can be kept within a predetermined tolerance range.

Figure 16:
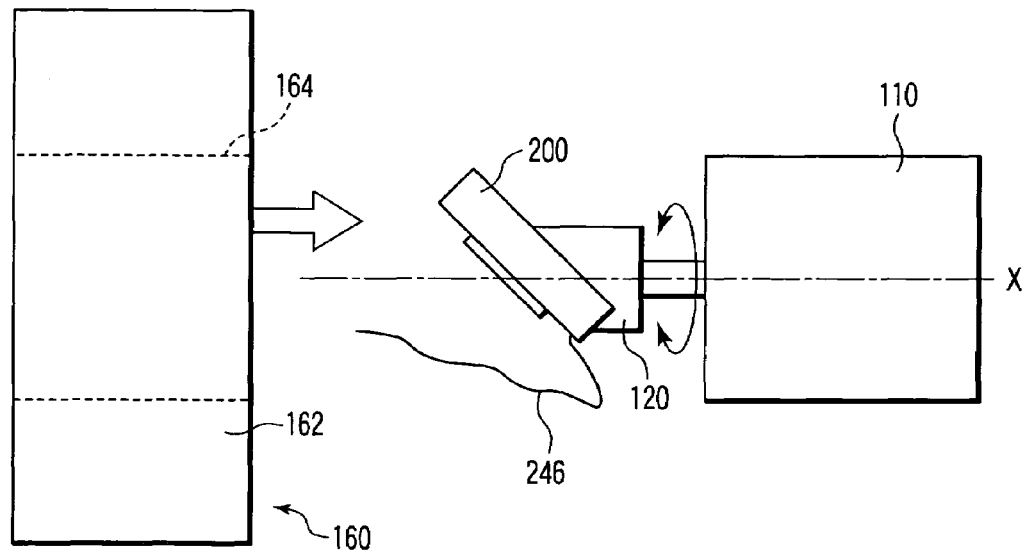
FIG. 16 is a view showing a state before the outer surface portion of the galvano deflector shown in FIGS. 1 and 2 is fitted in a galvano deflector mount hole in the holder body shown in FIG. 15.
Figure 17:
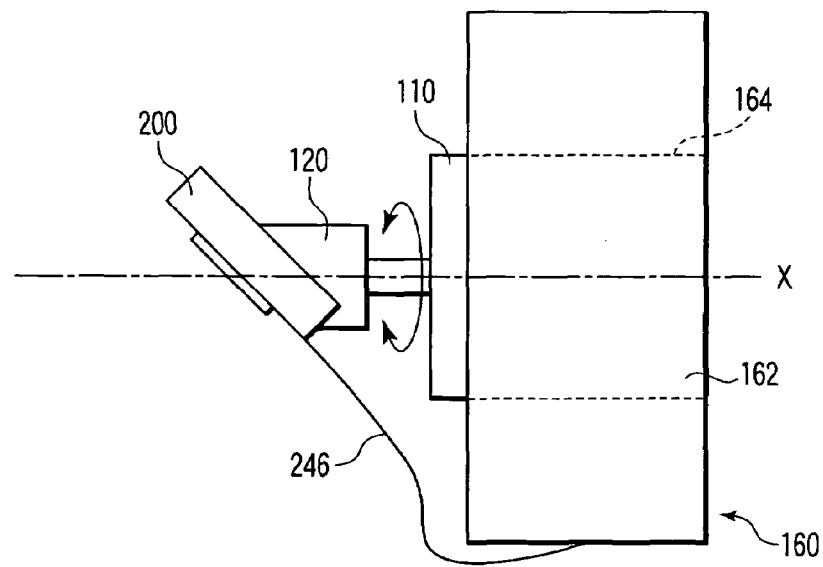
FIG. 17 is a view showing a state wherein the outer surface portion of the galvano deflector shown in FIGS. 1 and 2 is fitted in the galvano deflector mount hole in the holder shown in FIG. 15.

FIGS. 16 and 17 show the steps of fitting the outer surface portion of the galvano deflector of the two-dimensional optical deflector shown in FIGS. 1 and 2 in the galvano deflector mount hole of the holder body shown in FIG. 15. FIG. 16 shows a state before the outer surface portion of the galvano deflector is fitted in the galvano deflector mount hole of the holder body. FIG. 17 shows a state wherein the outer surface portion of the galvano deflector is fitted in the galvano deflector mount hole.

As shown in FIG. 16, the two-dimensional optical deflector is inserted into the galvano deflector mount hole 164 of the holder body 162 from the resonant MEMS deflector 200 side, as indicated by the arrow. As shown in FIG. 16, the outer surface portion of the galvano deflector 110 is fitted in the hole. At this time, it is preferable that the flexible wiring board 246 connected to the resonant MEMS deflector 200 be temporarily bent as shown in FIG. 16 so as not to hinder the assembly work. When the screw 168 shown in FIG. 15 is fastened while the outer surface portion of the galvano deflector 110 shown in FIG. 17 is fitted in the galvano deflector mount hole of the holder body, the galvano deflector 110 is reliably held on the holder 160.

Figure 18:
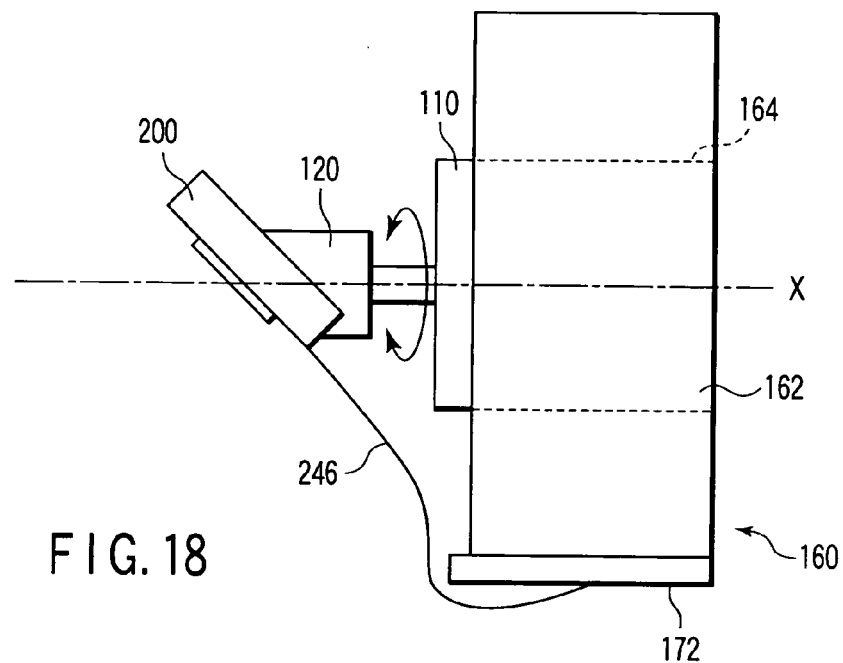
FIG. 18, which is a view similar to FIG. 17, shows a holder to which a wiring fixing member is fixed in advance.

An end portion of the flexible wiring board 246 is fixed to the holder 160 thereafter to complete the assembly work. More specifically, for example, as shown in FIG. 18, a wiring fixing member 172 is fixed to the holder 160 in advance, and an end portion of the flexible wiring board 246 is fixed to the wiring fixing member 172. Although not shown, it is preferable to use a technique of connecting a connector to the end portion of the flexible wiring board 246 in advance and fixing the connector to the wiring fixing member 172. However, the connecting method to be used is not limited to this. For example, a connector connected to a wiring may be directly fixed to the holder 160 instead of the wiring fixing member 172. Alternatively, a wiring may be directly fixed to the wiring fixing member 172 or holder 160 instead of a connector.

The assembly method shown in FIGS. 16 and 17 can be applied to only an arrangement in which both the resonant MEMS deflector 200 and the adapter 120 are entirely accommodated in the region defined by projecting the outer surface portion of the galvano deflector 110 in its rotation axis direction. In addition, it is necessary that the wiring connected to the resonant MEMS deflector 200 be a flexible wiring member (the flexible wiring board 246) and be at least temporarily accommodated within the above region at the time of assembly. In addition, in the two-dimensional optical deflector according to this embodiment, since the resonant MEMS deflector 200 and adapter 120 are accommodated in the above region, the moment of inertia, which acts as a load on the galvano deflector 110, is suppressed to a small value. This makes it possible to perform direct actuating operation by using the galvano deflector 110 instead of performing actuating operation through a speed reducer as in the prior art.

The functions and effects of this embodiment will be summarized as follows from the above description.

First of all, as shown in FIGS. 1 and 2, the resonant MEMS deflector 200 is mounted on the galvano deflector 110 at a tilt angle of 45°. Low-speed deflection and high-speed deflection are then performed by the galvano deflector 110 and resonant MEMS deflector 200, respectively, to realize two-dimensional deflection with little distortion. At this time, the load on the galvano deflector 110 can be greatly reduced by using the resonant MEMS deflector 200 shown in FIGS. 3 and 4 to 6 as compared with the prior art. In addition, using the resonant MEMS deflector 200 as an MEMS deflector can achieve a further reduction in size. As a consequence, this can achieve an increase in the speed of deflection by the galvano deflector 110 or a reduction in the size of the galvano deflector 110.

As shown in FIGS. 7 to 13, the resonant MEMS deflector 200 and galvano deflector 110 are fixed to each other through the adapter 120. In this case, the shape of the adapter 120 is designed so that while the adapter 120 and resonant MEMS deflector 200 are fixed to each other, the center of gravity G is located almost on the central axis of the fixing hole for the adapter 120 and galvano deflector 110. In addition, since the two screws 140 for fastening the adapter 120 to the galvano deflector 110 are arranged to be symmetrical with respect to the central axis, the position of the overall center of gravity G of the portions mounted on the galvano deflector 110 is located almost on the rotation axis of the galvano deflector 110. The above arrangement can therefore restrain the centrifugal force generated when the galvano deflector 110 rocks, thus suppressing unnecessary resonance.

In addition, the resonant MEMS deflector 200 and adapter 120 are fixed to each other at three positions by preferably using nonmagnetic or weak magnetic screws; they are fixed to each other by fastening the screws from the resonant MEMS deflector 200 side to the adapter 120. Furthermore, the spacer 144, adjusting mechanism (the MEMS fixing screw 146 and adjusting screw 148), or the like for adjusting the space between the resonant MEMS deflector 200 and the adapter 120 is used, and assembly is performed so that the reflecting surface 240 of the resonant MEMS deflector 200 takes a predetermined posture with respect to the adapter 120. The above operation can realize relatively easy, high-precision assembly work.

As shown in FIGS. 15 to 18, when the two-dimensional optical deflector is to be mounted on the holder 160, according to the two-dimensional optical deflector of this embodiment, since both the resonant MEMS deflector 200 and the adapter 120 are entirely accommodated in the region defined by projecting the outer surface portion of the galvano deflector 110 in its rotation axis direction, assembly work is facilitated, and the moment of inertia of the portions mounted on the galvano deflector 110 can be suppressed to a small value.

The above description concerns only the embodiment using the resonant MEMS deflector. However, a non-resonant deflector may be used as long as it is a deflector based on the MEMS technology, and one deflector may be actuated in both the resonant mode and the non-resonant mode.

Second Embodiment

Figure 19:
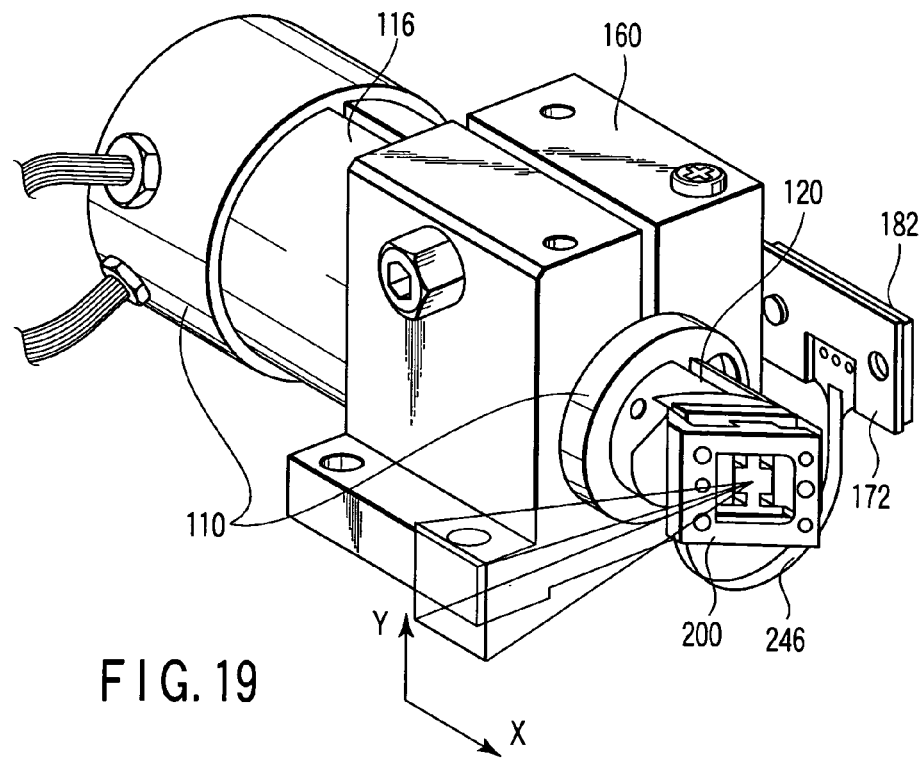
FIG. 19 is a perspective view of a two-dimensional optical deflector according to the second embodiment of the present invention.

FIG. 19 is a perspective view of a two-dimensional optical deflector according to the second embodiment of the present invention. The same reference numerals as in FIG. 19 denote the same members of the two-dimensional optical deflector according to the first embodiment. Although the basic arrangement of the second embodiment is the same as that of the first embodiment, the second embodiment differs from the first embodiment in the manner of routing the flexible wiring board connected to a resonant MEMS deflector. In the following description, emphasis is placed on the differences between the first and second embodiments.

As shown in FIG. 19, a flexible wiring board 246 is routed from a resonant MEMS deflector 200 in a direction parallel to the Y-axis, extends in an almost U shape when viewed from the X-axis direction, and is fixed to a wiring fixing member 172 provided on the opposite side to the portion routed from the resonant MEMS deflector 200 with respect to the X-axis. That is, the air routed portion of the flexible wiring board 246 extends between the resonant MEMS deflector 200 and the wiring fixing member 172, bending around a rotation shaft 112 of a galvano deflector 110 and extending along a plane almost perpendicular to the rotation shaft 112. In addition, the flexible wiring board 246 is routed in the air while its surface on which a wiring pattern is formed is always kept almost parallel to the X-axis. That is, the pattern-formed surface of the air routed portion is almost parallel to the rotation shaft 112 of the galvano deflector 110.

For this reason, the flexible wiring board 246 easily deforms when the resonant MEMS deflector 200 rocks about the X-axis (by the actuation of the galvano deflector 110), and the reaction force of the flexible wiring board 246 at the time of deformation is small. In addition, since the stress acting on the flexible wiring board 246 becomes bending stress in the direction of thickness, in which the rigidity of the board is low, it is easy to ensure high durability for the flexible wiring board 246.

The manner of routing the flexible wiring board 246 described above is not limited to an almost U shape, and may be changed as needed in accordance with reasons in terms of the design of each member or the overall layout. It is, however, preferable to maintain the direction of the pattern-formed surface to be parallel to the X-axis as much as possible. A connector board (rigid board) 182 is integrated with the end portion of the flexible wiring board 246, which is fixed to the wiring fixing member 172, thus facilitating fixing the flexible wiring board 246. In addition, since the wiring of the flexible wiring board 246 is electrically connected to a connector 184 (see FIG. 20) of the connector board 182, connection is facilitated when an extension cable (not shown) is to be used for electric connection between the connector 184 and an resonant MEMS deflector actuating circuit (not shown).

In this embodiment, a spacer 116 is used to position the galvano deflector 110 in the X direction with respect to a holder 160. Other portions are the same as those in the first embodiment. That is, an XY (two-dimensional) deflection pattern without distortion can be formed by performing deflection in the X direction using the resonant MEMS deflector 200 and deflection in the Y direction using the galvano deflector 110 as in the first embodiment.

Figure 20:
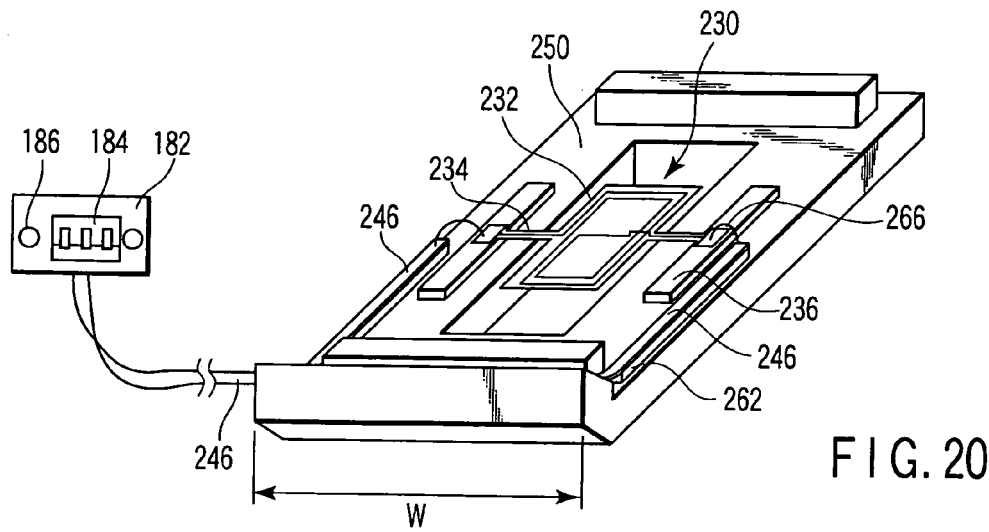
FIG. 20 is a perspective view of the main part of the resonant MEMS deflector shown in FIG. 19 (portions excluding a magnetic circuit, i.e., a metal base, deflector chip, and flexible wiring board)
Figure 21:
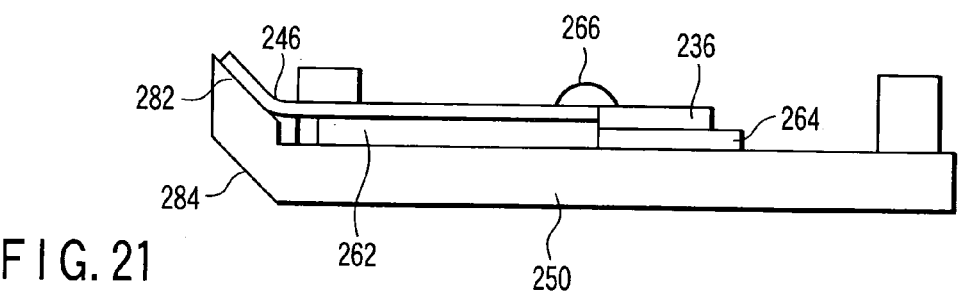
FIG. 21 is a side view of the metal base, deflector chip, and flexible wiring board shown in FIG. 20.

FIG. 20 is a perspective view of the main part (portions excluding a magnetic circuit, i.e., a metal base, deflector chip, and flexible wiring board) of the resonant MEMS deflector shown in FIG. 19. FIG. 21 is a side view of the metal base, deflector chip, and flexible wiring board shown in FIG. 20. Since the basic arrangement of the resonant MEMS deflector 200 of this embodiment is the same as that in the first embodiment shown in FIGS. 4 to 6, only different portions between them will be described.

In this embodiment, as shown in FIG. 20, a rigid board 262 of the wiring board (constituted by the rigid board 262 and flexible wiring board 246 that are integrated) is placed in a U shape on a metal base 250, and the two end portions of the U shape, which are connected by wire bondings 266, are located near extensions of torsion bars 234. With this structure, a width W of the metal base 250 (the dimension along the extension direction of the torsion bars 234) is suppressed to the value obtained by adding an assembly margin to the sum of the length of the deflector chip 230 (the dimension along the extension direction of the torsion bars 234) and the widths of the two end portions of the rigid board 262 (the dimensions along the extension direction of the torsion bars 234).

In this embodiment, in order to realize routing of the flexible wiring board 246 shown in FIG. 19, the routed portion of the flexible wiring board 246 is changed. Along with this change, the shape of the wiring board itself is changed. More specifically, the routed portion of the flexible wiring board 246 has a wiring board shape parallel to the torsion bars 234. In addition, as shown in detail in FIG. 21, a flexible wiring board guide portion 282 is provided on the metal base 250. The flexible wiring board guide portion 282 has an angle of about 45° with respect to a reflecting surface 240 of the deflector chip 230, which is placed on the rear surface side of a movable plate 232 in FIG. 20. With this structure, the wiring-formed surface of the flexible wiring board 246 fixed to the flexible wiring board guide portion 282 has an angle of about 45° with respect to the reflecting surface 240 of the deflector chip 230. Forming the metal base 250 in the resonant MEMS deflector 200 in this manner and routing the flexible wiring board 246 can realize routing of the flexible wiring board 246 shown in FIG. 19. In addition, a chamfered portion 284 is provided on the metal base 250 so as to face the flexible wiring board guide portion 282, so that an increase in the mass of the metal base 250 is suppressed.

Note that the connector 184 is fixed to the connector board 182, as shown in FIG. 20. In addition, mount holes 186 are formed in the connector board 182 to fix it to the wiring fixing member 172.

Figure 22:
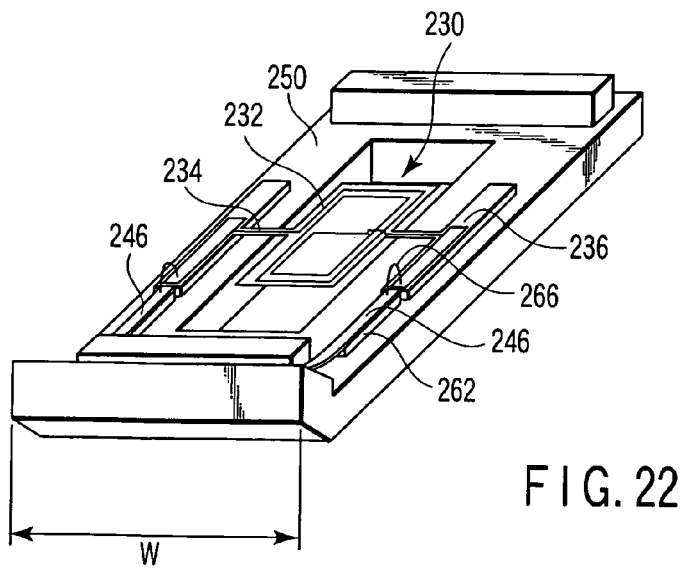
FIG. 22 is a perspective view of a modification to the metal base and a rigid board.

FIG. 22 is a perspective view of a modification to the metal base and the rigid board. In this modification, as shown in FIG. 22, the placement position of the rigid board 262 is changed to a position where it does not protrude from the deflector chip 230 in the extension direction of the torsion bars 234. That is, the overall length of the rigid board 262 is changed to a length almost equal to that of the deflector chip 230. The rigid board 262 is placed adjacent to the supports 236 of the deflector chip 230 in a direction perpendicular to the extension direction of the torsion bars 234. The wire bondings 266, which electrically connect the deflector chip 230 to the rigid board 262, extend in a direction almost perpendicular to the extension direction of the torsion bars 234. This further suppresses the width W of the metal base 250 to a smaller value. With this arrangement, the metal base 250 is reduced in size and weight, and hence a reduction in the overall size and weight of the MEMS deflector can be realized.

In the case of the mount form shown in FIG. 22, the deflector chip 230 and the rigid board 262 are arranged adjacent to each other in a direction perpendicular to the extension direction of the torsion bars 234. Therefore, after the deflector chip 230 is bonded to the metal base 250 and the supports 236 are formed by partly removing the support frame, the rigid board 262 may be bonded to the metal base 250. In this case, the above members are preferably bonded to each other after the supports 236 of the deflector chip 230 are brought near to the rigid board 262.

Figure 23:
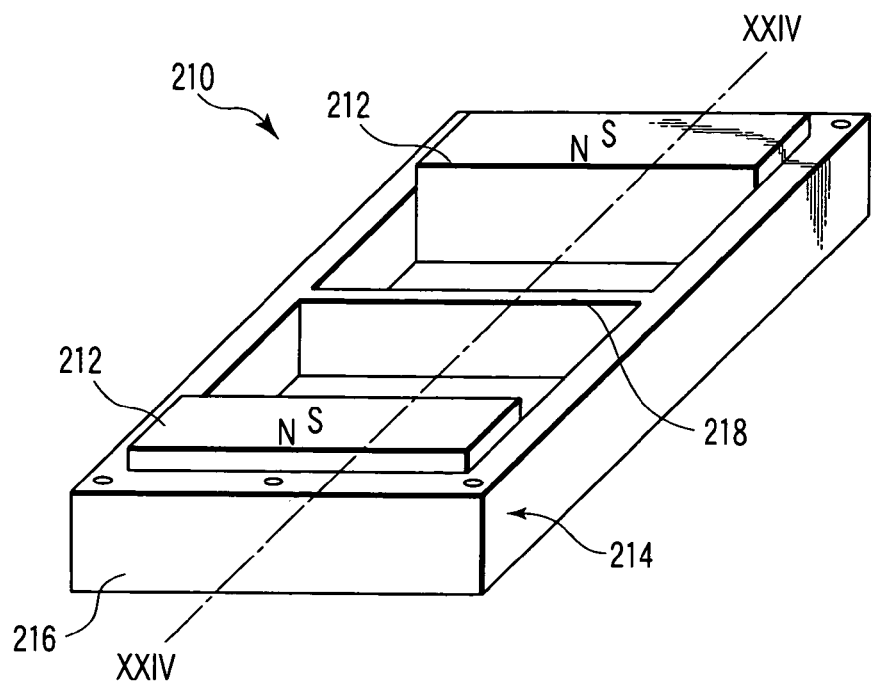
FIG. 23 is a perspective view of a magnetic circuit in the MEMS deflector according to the second embodiment.
Figure 24:
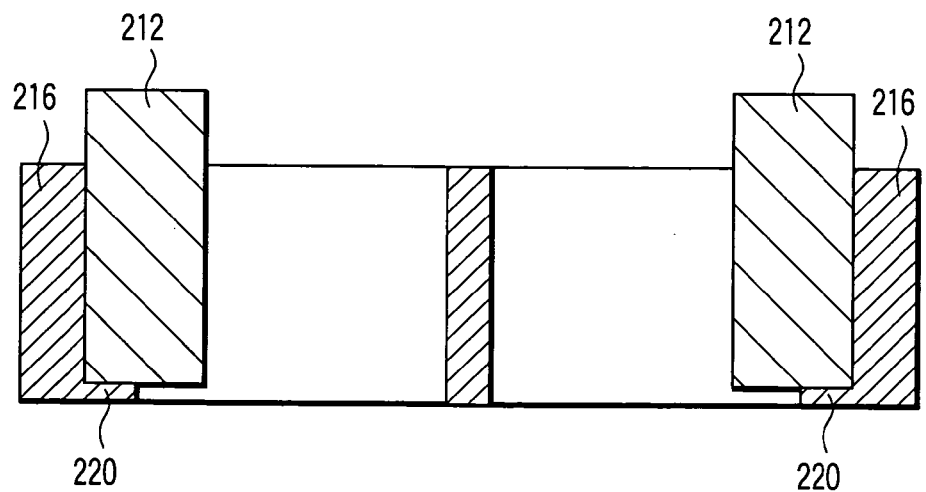
FIG. 24 is a sectional view taken along a line XXIV—XXIV of the magnetic circuit in FIG. 23.

FIG. 23 is a perspective view of a magnetic circuit in the resonant MEMS deflector according to this embodiment. FIG. 24 is a sectional view taken along a line XXIV—XXIV of the magnetic circuit in FIG. 23. FIG. 25 is a bottom view of the magnetic circuit shown in FIG. 23.

As shown in FIG. 23, a magnetic circuit 210 of the resonant MEMS deflector 200 is similar to the magnetic circuit 210 (see FIG. 6) in the first embodiment. As shown in FIGS. 24 and 25, however, a magnetic yoke 214 includes rear yokes 216 located outside permanent magnets 212 and lower yokes 220 located below the permanent magnets 212. An upper portion of each permanent magnet 212 protrudes from the magnetic yoke 214. The permanent magnets 212 are fixed to the magnetic yoke 214 mainly at the contact surfaces between the permanent magnets 212 and rear yokes 216, but also at the contact surfaces between the permanent magnets 212 and the lower yokes 220.

Referring to FIG. 24, since the upper portions of the permanent magnets 212 protrude from the magnetic yoke 214, the magnets always try to move to a neutral position in the vertical direction with respect to the magnetic yoke 214 (the most stable state in terms of energy). For this reason, downward force is generated in FIG. 24. In general, force in the shearing direction acts on the fixed surfaces between the permanent magnets 212 and the magnetic yoke 214. Such force in the shearing direction will degrade the adhesion between the permanent magnets 212 and the magnetic yoke 214.

In this embodiment, referring to FIG. 24, the permanent magnets 212 receiving downward force are supported by the lower yokes 220 of the magnetic yoke 214. This prevents degradation in adhesion due to the force in the shearing direction, and hence improves the stability and durability of the adhesive portions.

This can also eliminate the possibility of adhesion failure caused when force of inertia acts between the permanent magnets 212 and the rear yokes 216 upon actuation of the resonant MEMS deflector 200 by the galvano deflector 110. Just for reference, FIG. 26, which is similar to FIG. 24, shows a sectional view of the magnetic circuit 210 of the resonant MEMS deflector 200 according to the first embodiment.

The arrangement of the magnetic circuit 210 described above is effective not only for the resonant MEMS deflector 200 in the two-dimensional optical deflector of this embodiment but also for a resonant MEMS deflector to be used singly.

Figure 27:
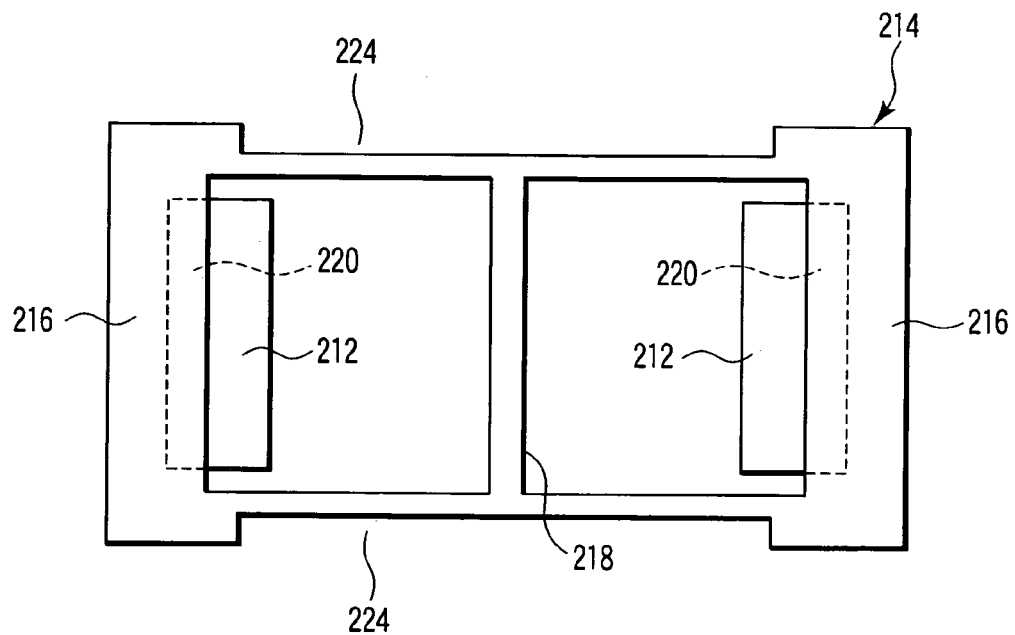
FIG. 27 is a view showing a modification to the magnetic circuit shown in FIGS. 23 to 25.

The arrangement of the magnetic circuit 210 is not limited to that described above. FIG. 27 shows a modification to the magnetic circuit 210. In this modification, as shown in FIG. 27, the magnetic yoke 214 includes run-offs 224 (notched portions) on the two sides of a middle yoke 218. The run-offs 224 serve to prevent the wire bondings 266 and magnetic yoke 214 from interfering with each other when the magnetic circuit 210 and metal base 250 are assembled.

Figure 28:
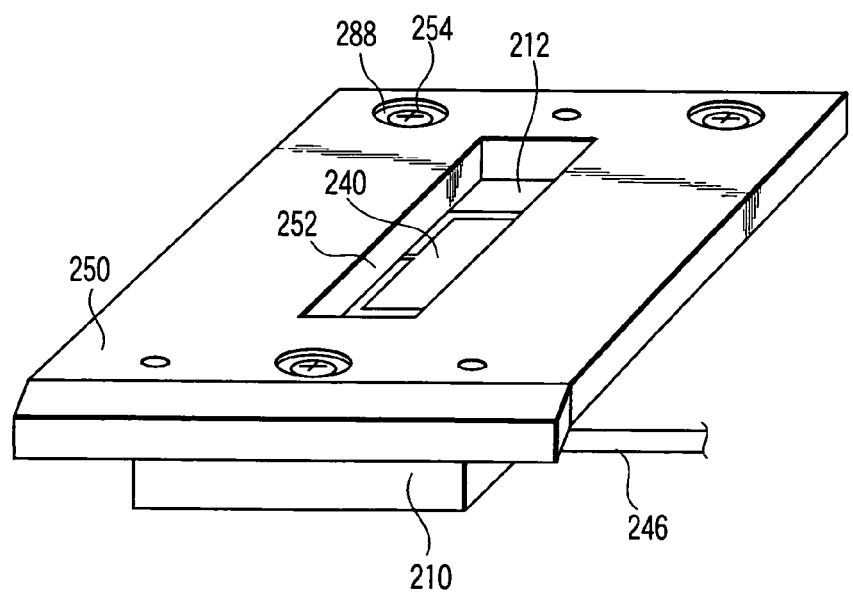
FIG. 28 is a perspective view of the MEMS deflector according to the second embodiment in an assembled state.
Figure 29:
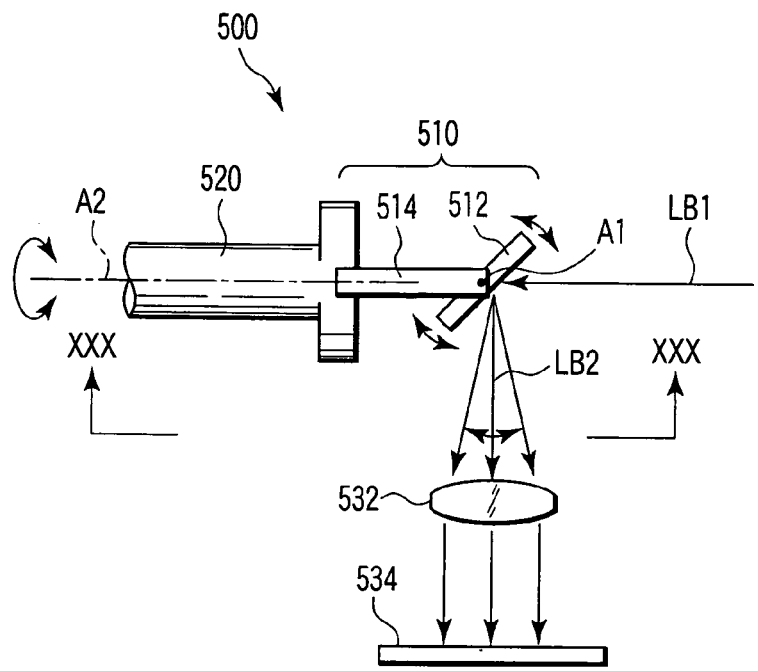
FIG. 29 is a view of the two-dimensional optical deflector disclosed in U.S. Pat. No. 4,838,632, which is viewed along a line XXIX—XXIX in FIG. 30.
Figure 30:
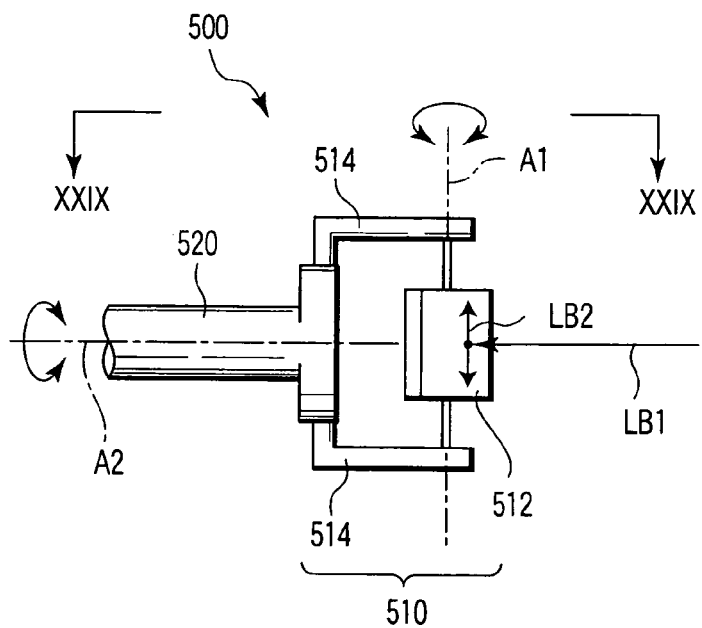
FIG. 30 is a view of the two-dimensional optical deflector disclosed in U.S. Pat. No. 4,838,632, which is viewed along a line XXX—XXX in FIG. 29.

FIG. 28 is a perspective view of the resonant MEMS deflector according to this embodiment in an assembled state. As shown in FIG. 28, the metal base 250 and magnetic circuit 210 are fixed to each other with three screws 254 (preferably nonmagnetic or weak magnetic screws), and counter bores 288 are provided around the holes, through which the screws 254 extend, so as to prevent the heads of the screws 254 from protruding from the uppermost surface of the metal base 250.

Such an arrangement is more suitable for the operation of providing a transparent dustproof cover on the resonant MEMS deflector 200 or providing a protective cover during assembly work. In addition, when the resonant MEMS deflector 200 is to be used singly and fixed to an external unit by using the upper surface in FIG. 28 as a reference surface, it can be mounted on the external unit without escaping the heads of the screws.

The arrangement shown in FIG. 28 can be applied to not only to the resonant MEMS deflector 200 of this embodiment but also to the resonant MEMS deflector 200 according to the first embodiment or the single MEMS deflector disclosed in Patent Application Publication No. US 2002/0060830 A1.

The functions and effects of this embodiment will be summarized from the above description.

As shown in FIG. 19, routing the flexible wiring board 246 connected to the resonant MEMS deflector 200 so as to make the pattern-formed surface always become parallel to the X-axis allows the flexible wiring board 246 to easily deform when the resonant MEMS deflector 200 rocks about the X-axis and reduces the reaction force of the flexible wiring board 246 when it deforms. In addition, since the stress acting on the flexible wiring board 246 becomes bending stress in the direction of thickness, in which the rigidity of the board is low, the durability of the flexible wiring board 246 can be easily ensured.

As shown in FIGS. 20 to 22, in the resonant MEMS deflector 200, the flexible wiring board 246 is routed in a direction parallel to the torsion bars 234 and also routed from the resonant MEMS deflector 200 in a direction in which the wiring pattern formed surface of the flexible wiring board 246 has an angle of about 45° with respect to the reflecting surface 240, so that routing of the flexible wiring board 246 shown in FIG. 19 is realized.

As shown in FIGS. 23 to 25 and 27, in the magnetic circuit 210 of the resonant MEMS deflector 200, the long-term stability of the fixed portion is improved by bringing each permanent magnet 212 into contact with the magnetic yoke 214 at two surfaces that are almost perpendicular to each other, and more specifically, by providing the lower yoke 220 for the permanent magnet 212 in addition to the rear yoke 216 and fixing them at the two surfaces of them.

As shown in FIG. 28, in the resonant MEMS deflector 200, the surface of the metal base 250 to which the deflector chip 230 is fixed (the surface on the opposite side to the surface to which the deflector chip 230 is fixed) is formed into a flat or concave surface while the heads of the fixing screws and the like do not protrude from the surface. This facilitates mounting another member on this surface or facilitates fixing the resonant MEMS deflector to an external unit at this surface.

In this embodiment, as in the first embodiment, the resonant MEMS deflector 200 is not limited to a resonant deflector and can be modified in the same manner as described above.

Although the embodiments of the present invention have been described above with reference to the views of the accompanying drawing, the present invention is not limited to these embodiments and may be variously modified and changed within the spirit and scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A two-dimensional optical deflector comprising:
 a first deflector for deflecting a light beam about a first axis at a high speed;
 a second deflector for deflecting a light beam about a second axis perpendicular to the first axis at a low speed; and
 a fixing mechanism for fixing the first deflector to the second deflector,
 the first deflector including a deflector chip and actuating means for actuating the deflector chip, the deflector chip including a movable portion having a reflecting surface, a support located outside the movable portion, and a connecting portion connecting the movable portion and the support, the connecting portion extending along the first axis, and being capable of twisting about the first axis, so as to allow the movable portion to rock about the first axis with respect to the support,
 the second deflector including a rotation shaft capable of rocking about the second axis, and
 the fixing mechanism including a fixing member having a rotation shaft fixing hole, which engages with the rotation shaft of the second deflector with substantially no space between them, and fastening means for decreasing a diameter of the rotation shaft fixing hole of the fixing member, the diameter of the rotation shaft fixing hole of the fixing member being decreased by the fastening means so that the fixing member is fixed to the rotation shaft of the second deflector, the fixing member further including a first deflector mount surface, on which the first deflector is mounted, the first deflector mount surface forming an angle of substantially 45° with respect to the second axis while the fixing member is fixed to the rotation shaft of the second deflector, and the fixing mechanism further including fixing means for fixing the first deflector to the fixing member so that the reflecting surface of the movable portion in a non-actuation state is substantially parallel to the first deflector mount surface of the fixing member.

2. A deflector according to claim 1, wherein a position of an overall center of gravity of the first deflector and the fixing mechanism that are fixed to each other is positioned substantially on a central axis of the rotation shaft fixing hole of the fixing member, so as to be substantially on the second axis, which is a central axis of the rotation shaft of the second deflector while the fixing member is fixed to the rotation shaft of the second deflector.

3. A deflector according to claim 2, wherein the fixing member is generally cylindrical, has as the first deflector mount surface an end face having an angle of 45° with respect to its central axis, and has a cutout near the other end face opposite to the 45°-inclined end face, the cutout including a part of the side surface that has the largest length along the central axis of the cylindrical member.

4. A deflector according to claim 3, wherein the fixing member comprises one member, and the fastening means comprises two substantially identical fastening tools, the two fastening tools being located substantially symmetrically with respect to the second axis, and one of the fastening tools being mainly used to fix the fixing member to the rotation shaft of the second deflector.

5. A deflector according to claim 1, wherein the fixing means comprises three fixing tools for fixing the first deflector to the fixing member from the first deflector side, and at least one space adjusting member for adjusting a space between the first deflector and the fixing member.

6. A deflector according to claim 5, wherein the fixing means includes three space adjusting members, the three space adjusting members comprising screws respectively provided near the three fixing tools.

7. A deflector according to claim 1, wherein the first deflector is of an electromagnetic actuation type, and the actuating means comprises a driving coil provided on a movable plate and a magnetic circuit generating a magnetic field crossing the driving coil, the magnetic circuit including a permanent magnet and a magnetic yoke, to which the permanent magnet is fixed, the permanent magnet being placed so that a magnetization direction of the permanent magnet is substantially perpendicular to the first axis and substantially parallel to the reflecting surface of the movable portion in a non-actuation state, the permanent magnet protruding from the magnetic yoke to one side along a direction substantially perpendicular to both the magnetization direction and the first axis, the permanent magnet and the magnetic yoke being mainly fixed at a surface substantially perpendicular to the magnetization direction, and at least portion of a surface of the permanent magnet that does not protrude from the magnetic yoke and is substantially perpendicular to both the magnetization direction and the first axis also being fixed to the magnetic yoke.

8. A deflector according to claim 1, further comprising a holding mechanism for holding the second deflector, and wherein the second deflector has a substantially cylindrical outer surface portion with a central axis substantially coinciding with the second axis, the holding mechanism has a holding member having a mount hole, which engages with the substantially cylindrical outer surface portion of the second deflector with substantially no space between them, and a fastening tool, which decreases a diameter of the mount hole of the holding member, the diameter of the mount hole of the holding member being decreased by the fastening tool, so that the second deflector is held on the holding member, and the first deflector and the fixing mechanism are located inside the mount hole in a projection onto a plane that is perpendicular to the second axis and crosses the mount hole.

9. A deflector according to claim 8, further comprising a flexible wiring member electrically and mechanically connected to the first deflector, and wherein an end portion of the wiring member that is located on an opposite side to an attaching portion with the first deflector is mechanically fixed to the holding member.

10. A deflector according to claim 9, wherein an air routed portion of the wiring member extending between the first deflector and the holding mechanism extends along a plane substantially perpendicular to the rotation shaft of the second deflector.

11. A deflector according to claim 10, wherein the wiring member extends while bending around the rotation shaft of the second deflector.

12. A deflector according to claim 11, wherein the wiring member comprises a flexible wiring board, and a wiring pattern formed surface of the air routed portion is substantially parallel to the rotation shaft of the second deflector.

13. A deflector according to claim 12, wherein a wiring pattern formed surface of the flexible wiring board forms an angle of substantially 45° with respect to the reflecting surface of the first deflector at the attaching portion with the first deflector.

14. A deflector according to claim 3, further comprising a holding mechanism for holding the second deflector, and wherein the second deflector has a substantially cylindrical outer surface portion with a central axis substantially coinciding with the second axis, the holding mechanism has a holding member having a mount hole, which engages with the substantially cylindrical outer surface portion of the second is deflector with substantially no space between them, and a fastening tool, which decreases a diameter of the mount hole of the holding member, the diameter of the mount hole of the holding member being decreased by the fastening tool, so that the second deflector is held on the holding member, and the first deflector and the fixing mechanism are located inside the mount hole in a projection onto a plane that is perpendicular to the second axis and crosses the mount hole.

15. A deflector according to claim 14, further comprising a flexible wiring member electrically and mechanically connected to the first deflector, and wherein an end portion of the wiring member that is located on an opposite side to an attaching portion with the first deflector is mechanically fixed to the holding member.

16. A deflector according to claim 15, wherein an air routed portion of the wiring member extending between the first deflector and the holding mechanism extends along a plane substantially perpendicular to the rotation shaft of the second deflector.

17. A deflector according to claim 16, wherein the wiring member extends while bending around the rotation shaft of the second deflector.

18. A deflector according to claim 17, wherein the wiring member comprises a flexible wiring board, and a wiring pattern formed surface of the air routed portion is substantially parallel to the rotation shaft of the second deflector.

19. A deflector according to claim 18, wherein a wiring pattern formed surface of the flexible wiring board forms an angle of substantially 45° with respect to the reflecting surface of the first deflector at the attaching portion with the first deflector.

20. A two-dimensional optical deflector comprising:
a first deflector, which deflects a light beam about a first axis at a high speed;
a second deflector, which deflects a light beam about a second axis perpendicular to the first axis at a low speed; and
a fixing mechanism, which fixes the first deflector to the second deflector,
the first deflector including a deflector chip and an actuator, which actuates the deflector chip, the deflector chip including a movable portion having a reflecting surface, a support located outside the movable portion, and a connecting portion connecting the movable portion and the support, the connecting portion extending along the first axis, and being capable of twisting about the first axis, so as to allow the movable portion to rock about the first axis with respect to the support,
the second deflector including a rotation shaft capable of rocking about the second axis, and
the fixing mechanism including a fixing member having a rotation shaft fixing hole, which engages with the rotation shaft of the second deflector with substantially no space between them, and a fastener, which decreases a diameter of the rotation shaft fixing hole of the fixing member, the diameter of the rotation shaft fixing hole of the fixing member being decreased by the fastener so that the fixing member is fixed to the rotation shaft of the second deflector, the fixing member further including a first deflector mount surface, on which the first deflector is mounted, the first deflector mount surface forming an angle of substantially 45° with respect to the second axis while the fixing member is fixed to the rotation shaft of the second deflector, and the fixing mechanism further including a fixer, which fixes the first deflector to the fixing member so that the reflecting surface of the movable portion in a non-actuation state is substantially parallel to the first deflector mount surface of the fixing member.

21. A deflector according to claim 20, wherein a position of an overall center of gravity of the first deflector and the fixing mechanism that are fixed to each other is positioned substantially on a central axis of the rotation shaft fixing hole of the fixing member, so as to be substantially on the second axis, which is a central axis of the rotation shaft of the second deflector while the fixing member is fixed to the rotation shaft of the second deflector.

22. A deflector according to claim 21, wherein the fixing member is generally cylindrical, has as the first deflector mount surface an end face having an angle of 45° with respect to its central axis, and has a cutout near the other end face opposite to the 45°-inclined end face, the cutout including a part of the side surface that has the largest length along the central axis of the cylindrical member.

23. A deflector according to claim 22, wherein the fixing member comprises one member, and the fastener comprises two substantially identical fastening tools, the two fastening tools being located substantially symmetrically with respect to the second axis, and one of the fastening tools being mainly used to fix the fixing member to the rotation shaft of the second deflector.

24. A deflector according to claim 20, wherein the fixer comprises three fixing tools, which fix the first deflector to the fixing member from the first deflector side, and at least one space adjusting member, which adjusts a space between the first deflector and the fixing member.

25. A deflector according to claim 24, wherein the fixer includes three space adjusting members, the three space adjusting members comprising screws respectively provided near the three fixing tools.

26. A deflector according to claim 20, wherein the first deflector is of an electromagnetic actuation type, and the actuator comprises a driving coil provided on a movable plate and a magnetic circuit, which generates a magnetic field crossing the driving coil, the magnetic circuit including a permanent magnet and a magnetic yoke, to which the permanent magnet is fixed, the permanent magnet being placed so that a magnetization direction of the permanent magnet is substantially perpendicular to the first axis and substantially parallel to the reflecting surface of the movable portion in a non-actuation state, the permanent magnet protruding from the magnetic yoke to one side along a direction substantially perpendicular to both the magnetization direction and the first axis, the permanent magnet and the magnetic yoke being mainly fixed at a surface substantially perpendicular to the magnetization direction, and at least portion of a surface of the permanent magnet that does not protrude from the magnetic yoke and is substantially perpendicular to both the magnetization direction and the first axis also being fixed to the magnetic yoke.

27. A deflector according to claim 20, further comprising a holding mechanism, which holds the second deflector, and wherein the second deflector has a substantially cylindrical outer surface portion with a central axis substantially coinciding with the second axis, the holding mechanism has a holding member having a mount hole, which engages with the substantially cylindrical outer surface portion of the second deflector with substantially no space between them, and a fastening tool, which decreases a diameter of the mount hole of the holding member, the diameter of the mount hole of the holding member being decreased by the fastening tool, so that the second deflector is held on the holding member, and the first deflector and the fixing mechanism are located inside the mount hole in a projection onto a plane that is perpendicular to the second axis and crosses the mount hole.

28. A deflector according to claim 27, further comprising a flexible wiring member electrically and mechanically connected to the first deflector, and wherein an end portion of the wiring member that is located on an opposite side to an attaching portion with the first deflector is mechanically fixed to the holding member.

29. A deflector according to claim 28, wherein an air routed portion of the wiring member extending between the first deflector and the holding mechanism extends along a plane substantially perpendicular to the rotation shaft of the second deflector.

30. A deflector according to claim 29, wherein the wiring member extends while bending around the rotation shaft of the second deflector.

31. A deflector according to claim 30, wherein the wiring member comprises a flexible wiring board, and a wiring pattern formed surface of the air routed portion is substantially parallel to the rotation shaft of the second deflector.

32. A deflector according to claim 31, wherein a wiring pattern formed surface of the flexible wiring board forms an angle of substantially 45° with respect to the reflecting surface of the first deflector at the attaching portion with the first deflector.

33. A deflector according to claim 22, further comprising a holding mechanism, which holds the second deflector, and wherein the second deflector has a substantially cylindrical outer surface portion with a central axis substantially coinciding with the second axis, the holding mechanism has a holding member having a mount hole, which engages with the substantially cylindrical outer surface portion of the second deflector with substantially no space between them, and a fastening tool, which decreases a diameter of the mount hole of the holding member, the diameter of the mount hole of the holding member being decreased by the fastening tool, so that the second deflector is held on the holding member, and the first deflector and the fixing mechanism are located inside the mount hole in a projection onto a plane that is perpendicular to the second axis and crosses the mount hole.

34. A deflector according to claim 33, further comprising a flexible wiring member electrically and mechanically connected to the first deflector, and wherein an end portion of the wiring member that is located on an opposite side to an attaching portion with the first deflector is mechanically fixed to the holding member.

35. A deflector according to claim 34, wherein an air routed portion of the wiring member extending between the first deflector and the holding mechanism extends along a plane substantially perpendicular to the rotation shaft of the second deflector.

36. A deflector according to claim 35, wherein the wiring member extends while bending around the rotation shaft of the second deflector.

37. A deflector according to claim 36, wherein the wiring member comprises a flexible wiring board, and a wiring pattern formed surface of the air routed portion is substantially parallel to the rotation shaft of the second deflector.

38. A deflector according to claim 37, wherein a wiring pattern formed surface of the flexible wiring board forms an angle of substantially 45° with respect to the reflecting surface of the first deflector at the attaching portion with the first deflector.

* * * * *